(12) United States Patent
Turner

(10) Patent No.: US 7,472,918 B2
(45) Date of Patent: Jan. 6, 2009

(54) TELESCOPING SUSPENSION FORK HAVING A QUICK RELEASE WHEEL COMPONENT CLAMP

(75) Inventor: Paul H. Turner, Boulder, CO (US)

(73) Assignee: Blackglass LLC, Boulder, CO (US)

(*) Notice: Subject to any disclaimer, the term of this patent is extended or adjusted under 35 U.S.C. 154(b) by 460 days.

(21) Appl. No.: 11/258,361

(22) Filed: Oct. 24, 2005

(65) Prior Publication Data

US 2006/0087096 A1  Apr. 27, 2006

Related U.S. Application Data

(60) Continuation-in-part of application No. 10/627,540, filed on Jul. 25, 2003, now Pat. No. 6,964,425, which is a division of application No. 10/120,474, filed on Apr. 10, 2002, now Pat. No. 6,669,219.

(51) Int. Cl.
    B62K 25/02 (2006.01)
(52) U.S. Cl. ................................. 280/284; 280/288
(58) Field of Classification Search ............. 280/284, 280/276, 279, 274, 288; 403/374.1; 292/256.69; 285/409, 367
    See application file for complete search history.

(56) References Cited

U.S. PATENT DOCUMENTS

| 4,485,530 | A | 12/1984 | Begley et al. |
| 4,561,669 | A | 12/1985 | Simons |
| 4,893,384 | A | 1/1990 | Bidoia et al. |
| 5,058,913 | A | 10/1991 | La Riviere et al. |
| 5,186,481 | A | 2/1993 | Turner |
| 5,215,324 | A | 6/1993 | Kawai |
| 5,238,259 | A | 8/1993 | Wilson et al. |
| D340,434 | S | 10/1993 | Hammer et al. |
| D344,253 | S | 2/1994 | Bishop et al. |
| 5,301,973 | A | 4/1994 | Truchinski |
| 5,417,446 | A | 5/1995 | Pileggi |
| D359,014 | S | 6/1995 | Haney et al. |
| 5,449,188 | A | 9/1995 | Ohma |
| 5,470,090 | A | 11/1995 | Stewart et al. |
| 5,509,674 | A | 4/1996 | Browning |
| 5,517,878 | A | 5/1996 | Klein et al. |
| 5,540,465 | A | 7/1996 | Sisk |
| 5,549,315 | A | 8/1996 | Ashman |
| 5,580,075 | A | 12/1996 | Turner et al. |
| 5,634,653 | A | 6/1997 | Browning |
| D391,530 | S | 3/1998 | Turner |
| D401,537 | S | 11/1998 | Turner |

(Continued)

FOREIGN PATENT DOCUMENTS

GB  2 345 893 A  7/2000

*Primary Examiner*—Tony H. Winner
(74) *Attorney, Agent, or Firm*—Townsend and Townsend and Crew LLP

(57) ABSTRACT

A releasable clamp system for clamping a wheel component to a vehicle includes a frame member and a cover plate that is pivotally coupled to the frame member. The cover plate is movable between a closed portion where the cover plate and the frame member encompass the wheel component and an open position that permits removal of the wheel component. A lever is pivotally attached to the cover plate and a hook member is pivotally attached to the lever. An adjustment system is used to adjust the clamping force applied to the wheel component by the frame member and the cover plate.

20 Claims, 19 Drawing Sheets

U.S. PATENT DOCUMENTS

| | | |
|---|---|---|
| 5,848,675 A | 12/1998 | Gonzalez |
| 5,848,799 A | 12/1998 | Huan |
| D406,083 S | 2/1999 | Turner |
| 5,881,606 A | 3/1999 | Roddy |
| D412,972 S | 8/1999 | Kroulik |
| 5,947,498 A | 9/1999 | Rajaee |
| 5,957,244 A | 9/1999 | Turner |
| 5,996,746 A | 12/1999 | Turner et al. |
| 6,042,091 A | 3/2000 | Marzocchi et al. |
| 6,095,541 A | 8/2000 | Turner et al. |
| 6,105,987 A | 8/2000 | Turner |
| 6,105,988 A | 8/2000 | Turner et al. |
| 6,135,668 A | 10/2000 | Lin |
| 6,260,832 B1 | 7/2001 | Vignocchi et al. |
| 6,260,931 B1 | 7/2001 | Stewart |
| 6,290,304 B1 | 9/2001 | Lashinske |
| 6,343,807 B1 | 2/2002 | Rathbun |
| 6,409,281 B1 | 6/2002 | Kanehisa et al. |
| 6,412,803 B1 | 7/2002 | Lalikyan et al. |
| 6,520,710 B2 | 2/2003 | Wells |
| 6,568,664 B2 | 5/2003 | Furuya |
| 6,581,492 B1 | 6/2003 | Chen |
| 6,581,948 B2 | 6/2003 | Fox |
| 6,669,219 B2 | 12/2003 | Turner et al. |
| 6,824,154 B1 | 11/2004 | Turner |
| 2003/0193161 A1 | 10/2003 | Turner et al. |
| 2004/0046354 A1 | 3/2004 | Turner |
| 2005/0189185 A1 | 9/2005 | Turner |

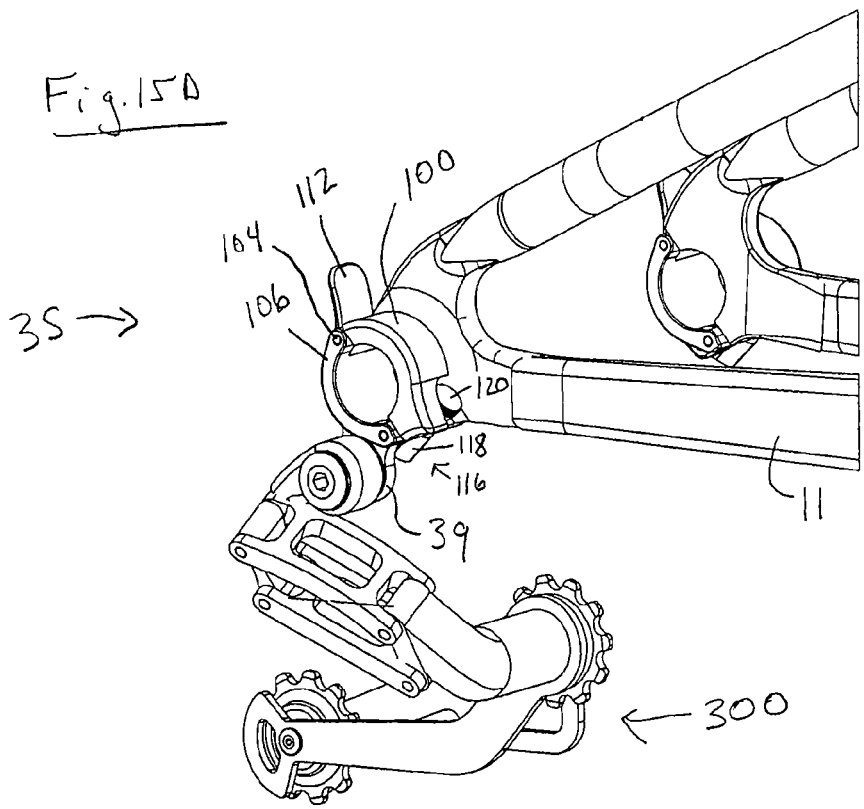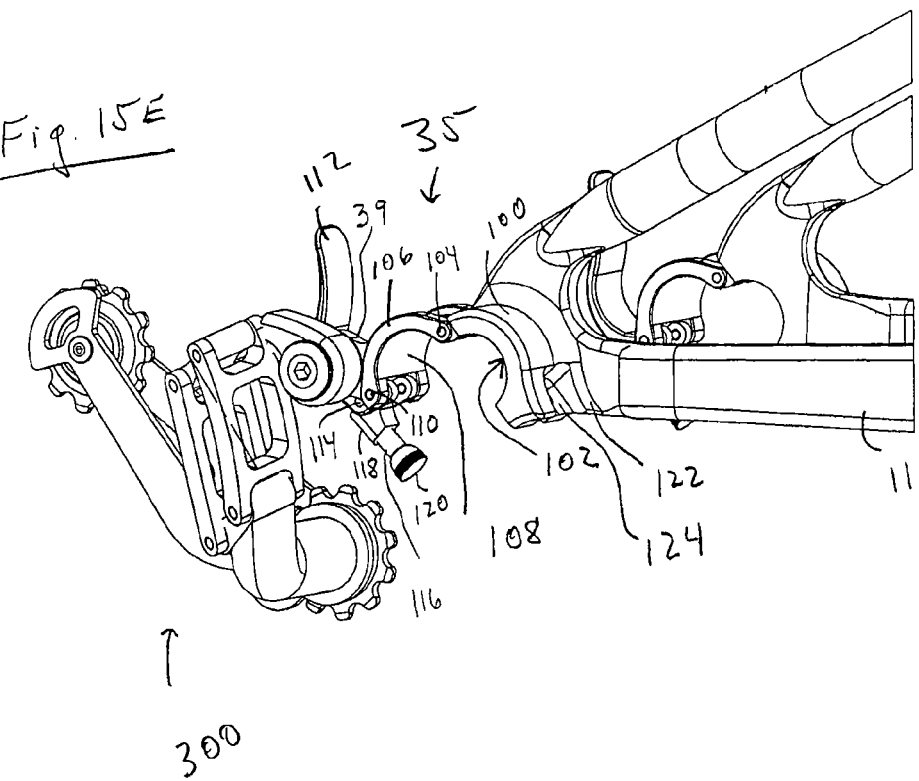

TELESCOPING SUSPENSION FORK HAVING A QUICK RELEASE WHEEL COMPONENT CLAMP

CROSS-REFERENCES TO RELATED APPLICATIONS

This application is a continuation-in-part of U.S. patent application Ser. No. 10/627,540 filed Jul. 25, 2003 (now U.S. Pat. No. 6,964,425; which is a divisional of U.S. patent application Ser. No. 10/120,474 filed Apr. 10, 2002, (now U.S. Pat. No. 6,669,219), the complete disclosures of which are herein incorporated by reference.

BACKGROUND OF THE INVENTION

This invention relates generally to the field of wheeled vehicles. More specifically, the invention relates to releasable wheel clamping systems for recreational wheeled vehicles and other wheeled devices.

The use of front and full suspensions in two wheeled vehicles has become widespread. For example, motorcycles have long had suspension systems. In recent years, front and full suspension systems in mountain bikes have become almost standard equipment. One pioneering effort to create such suspension systems was spearheaded by Rockshox, Inc. as described generally in U.S. Pat. Nos. 4,971,344; 5,186,481; 5,456,480; and 5,580,075, the complete disclosures of which are herein incorporated by reference. Another successful suspension system for a wheeled vehicle is described in U.S. Pat. Nos. 6,615,960 and 6,450,521, the complete disclosures of which are herein incorporated by reference.

Despite these advancements, cycling enthusiasts and competitors continue to seek components that provide greater weight savings while at the same time provide improved durability and strength. The releasable wheel clamping systems and methods of the present invention provide solutions for at least some of such needs.

BRIEF SUMMARY OF THE INVENTION

In one embodiment, the invention provides a telescoping fork for the wheel of a wheeled vehicle. The fork comprises a pair of outer tubes that each have a top end and a bottom end. An upper structural member and a lower structural member are employed to connect the outer tubes, with the lower structural member being spaced below the upper structural member. Further, each outer tube tapers outwardly, both externally and internally, in a direction both from the top end and the bottom end toward the lower structural member. With such a configuration, the strength of the outer tubes is increased without significantly increasing the weight of the fork.

In one aspect, the lower structural member is welded to the outer tubes, and steering bearings are coupled between the upper structural member and the lower structural member. With this configuration, the steering bearings may be used to attach the fork to a vehicle frame. In another aspect, the lower structural member may have a hollow box sectional shape.

In one particular arrangement, the fork further includes a pair of inner tubes that are disposed to slide within the pair of outer tubes. The inner tubes each have a bottom end and a top end, and the bottom ends of the inner tubes extend out of the bottom ends of the outer tubes. In one option, a single bushing may be disposed between each outer tube and each inner tube. The bushings may be located at the bottom ends of the outer tubes and have a length that is longer than a diameter of the inner tube. The use of such a bushing helps maintain an oil layer between the bushing and the inner tube.

In another particular aspect, the fork may include a bracket disposed at the bottom end of each inner tube. The brackets are employed to clamp a front wheel axle to the inner tubes. Optionally, at least one of the brackets may have a mount for receiving a disk brake caliper.

Another feature of the fork is the use of a handle bar clamping device that is coupled to the upper structural member. In this way, a handle bar may be coupled to the fork.

One particular embodiment of the invention is an adjustable fluid damping system. The fluid damping system may comprise a damper tube extending upward from the top end of the inner tube (and in some cases the damper tube may simply be an extension of the inner tube), a hollow damper rod coupled to the top end of the outer tube and extending into the damper tube, and a damper piston valve coupled to the damper rod that seals against the damper tube. The fluid clamping system may further include a lock tube that is disposed within the damper rod. The damper rod may have at least one upper orifice and one lower orifice, and the lock tube may be rotatable from the top end of the outer tube to close the lower orifice to limit the amount of extension of the lower tube out of the upper tube. In this way, the amount of extension of the suspension system may easily be adjusted from outside of the fluid damping system. For instance, when ready to climb a steep hill, the rider may quickly adjust the lock tube by turning a knob to limit the amount of extension during climbing.

In one particular aspect, this is accomplished by configuring the damper piston valve as a one-way valve that permits fluid flow in an upward direction upon compression of the inner tube into the outer tube. Further, a sleeve may be disposed over a top portion of the damper rod and the lock tube. The sleeve is configured to close the upper orifice as the upper tube extends relative to the lower tube, such that further extension is prevented if the lower orifice is closed by the lock tube. Conveniently, a stop may be positioned between the top of the outer tube and the top of the inner tube to stop compression of the inner tube into the outer tube.

In one alternative aspect, the inner tube may have a closed end or section, and a sealed piston may be disposed inside the inner tube. The piston may be connected to a rod that extends and attaches to the top end of the outer tube. Further, a gas may be held within the inner tube and is compressed by the piston to provide a damping effect. Optionally, a spring may be disposed between the bottom end of the inner tube and the piston to form a biasing effect. The rod may also be hollow to permit the gas pressure in the inner tube to be adjusted by a valve at the top end of the outer tube.

In a further embodiment, the invention provides a releasable clamp system for clamping a wheel component of a wheel to a wheeled vehicle. Such a wheel component may include, for example, an axle, a spacer, or the like. The clamp system comprises a frame member that defines a shape that is configured to receive a portion of the wheel component. A cover plate is pivotally attached to the frame member and is configured to receive another portion of the wheel component. In this way, the cover plate may be moved to a closed position where the frame member and the cover plate generally encompass and clamp the wheel component, and to an open position where the wheel component may be removed. A lever is pivotally attached to the cover plate, and a hook member is pivotally attached to the lever. The hook member is configured to hook onto the frame member and be pulled by the lever to secure the cover plate to the frame member when the cover plate is moved to the closed position.

In one aspect, the cover plate may be pivotally attached to a top end of the frame member to permit the wheel component to be vertically released from the frame member. In another aspect, the inner surfaces of the frame member and the cover plate that are adjacent the wheel component are each semicircular in geometry.

In a further aspect, the hook member may be T-shaped, and the frame member may include a shoulder with a slot into which the hook member is received. Optionally, the hook member may be constructed of two pieces that are threadably connected together. In this way, the clamping force on the wheel component may be adjusted by rotating the pieces relative to each other prior to clamping.

In yet another aspect, torsion springs may be provided at pivot points located where the cover plate attaches to the frame member and where the lever attaches to the cover plate. The torsion springs hold the cover plate open when not clamping the wheel component. Further, a mount may be provided on the frame member to mount a disk brake caliper to the frame member.

In one aspect, the present invention provides a releasable clamp system for clamping a wheel component, such as a wheel axle, spacer or the like, of a wheel to a vehicle. The releasable clamp system can include a suspension member of the vehicle, and a frame member defining a shape that is adapted to receive a portion of the wheel component. The frame member can be coupled with the suspension member of the vehicle. The clamp system can also include a cover plate pivotally attached to the frame member that is adapted to receive another portion of the wheel component. The cover plate may be movable between a closed position where the frame member and the cover plate generally encompass and clamp the wheel component, and an open position that permits removal of the wheel component. The clamp system can also include a lever pivotally attached to the cover plate, and a hook member pivotally attached to the lever. The hook member can be configured to hook onto the frame member and be pulled by the lever to move the cover plate toward the frame member when the cover plate is moved to the closed position.

In some aspects, the suspension member may include a swingarm or a rear chain stay, and the frame member may include a rear dropout. In some aspects, the suspension member may include a front fork and the frame member may include a front fork tip. In related aspects, the clamp system may also include an adjustment system that is configured to adjust the clamping force applied to the axle by the frame member and the cover plate when the lever is pulled. The cover plate can be pivotally attached to a top of the frame member to permit the wheel component to be vertically released downward from the frame member. In some aspects, the frame member and the cover plate may each have inner surfaces that are adjacent to the wheel component when the cover plate is in the closed position. The inner surfaces and the wheel component each can have a semi circular geometry.

In some aspects, the hook member can have a T shaped geometry or a ball shaped geometry, and the frame member can have a means for engaging or securing the hook member to the frame members, such as a shoulder with a slot into which the hook member is receivable. The hook member may have two pieces that are threadably connected together such that the clamping force applied to the wheel component is adjustable by rotating the two pieces relative to each other. In still further aspects, the cover plate can be pivotally attached to the suspension member at a pivot point. The lever can be pivotally attached to the cover plate at a pivot point. The clamp system may also include torsion springs at each of the pivot points to hold the cover plate in the open position when not clamping the wheel component. In some aspects, the clamp system may further include a derailleur mounting tab coupled with either the frame member, the cover plate, or the suspension member. In related aspects, the clamp system may also include a derailleur coupled with the derailleur mounting tab. In some aspects an area of the frame member that receives the wheel component can be configured such that the frame member rests on a toward portion of the wheel component when installing the wheel onto the vehicle.

In another aspect, the present invention provides a releasable clamp system for clamping a wheel component of a wheel to a vehicle. The clamp system can include a suspension member of the vehicle, a frame member defining a shape that is adapted to receive a portion of the wheel component, a cover plate pivotally attached to the frame member that is adapted to receive another portion of the wheel component, a lever pivotally attached to the frame member, and a hook member pivotally attached to the lever. The frame member can be coupled with the suspension member of the vehicle. The cover plate can be movable between a closed position where the frame member and the cover plate generally encompass and clamp the wheel component, and an open position that permits removal of the wheel component. The hook member can be configured to hook onto the cover plate and be pulled by the lever to secure the cover plate toward the frame member when the cover plate is moved to the closed position.

In some aspects, the suspension member can include a swingarm or a rear chainstay and the frame member can include a rear dropout. In related aspects, the suspension member can include a front fork and the frame member can include a front fork tip. The hook member can have a T shaped geometry or a ball shaped geometry, and the frame member can include a means for engaging or securing the hook member to the frame member, such as a shoulder with a slot into which the hook member is receivable. In some aspects, the clamp system can include a derailleur mounting tab coupled with either a frame member, a cover plate, or a suspension member. In related aspects, an area of the frame member that receives the wheel component can be configured such that the frame member rests on a toward portion of the wheel component when installing the wheel onto the vehicle.

In another aspect, the present invention provides a releasable clamp system for clamping a wheel component of a wheel to a vehicle. The clamp system can include a suspension member of the vehicle, where a frame member of the suspension member defines a shape that is adapted to receive a portion of the wheel component. The clamp system can also include a cover plate pivotally attached to the frame member that is adapted to receive another portion of the wheel component, and a means for securing the cover plate into the closed position and therefore clamping the wheel component in place. The frame member can be coupled with the suspension member of the vehicle. The cover plate can be movable between a closed position where the frame member and the cover plate generally encompass and clamp the wheel component, and an open position that permits removal of the wheel component. In some aspects, the means for securing the cover plate can include a lever that is moveable between a locked position corresponding to the closed position of the cover plate, and an unlocked position corresponding to the open position of the cover plate, such that movement of the lever between the locked position and the unlocked position defines a plane of movement that intersects the frame member. In related aspects, the clamp system can also include an adjustment system that is configured to adjust the clamping force applied to the axle by the frame member and the cover plate when the lever is pulled.

BRIEF DESCRIPTION OF THE DRAWINGS

FIGS. 15A-E illustrate perspective views of a releasable clamp system according to one embodiment of the present invention.

DETAILED DESCRIPTION OF THE INVENTION

In one aspect, the invention provides various suspension systems having a variety of features. One such feature is the use of fork that is constructed of telescoping outer tubes. The tubes have an inner diameter and an outer diameter that both increases in a direction from the axle mount upward as well as from the top of the fork downward. The maximum amount of taper may occur near where the two tubes are joined together by a structural member. For example, the tubes may taper outward from an inner diameter in the range from about 32 mm to about 34 mm and an outer diameter in the range from about 34 mm to about 38 mm, to an inner diameter in the range from about 44 mm to about 48 mm and an outer diameter in the range from about 48 mm to about 52 mm, although other dimensions are possible. Such a configuration increases the strength of the fork without appreciably increasing its weight.

Another feature of the invention is the ability to limit the amount of extension of the suspension system. This may be done manually from outside of the suspension system. For example, such an adjustment may be done by simply turning a knob. Such a feature is useful when peddling uphill to keep the front end of the bicycle closer to the ground to prevent tipping backward. When on level or down sloping terrain, the suspension system may again be adjusted to permit full extension.

A further feature is a releasable clamp system that provides for a quick release of the wheel from the fork or other suspension member. By the simple operation of a lever, the wheel may be vertically released from the fork or other suspension member.

Figure 1:
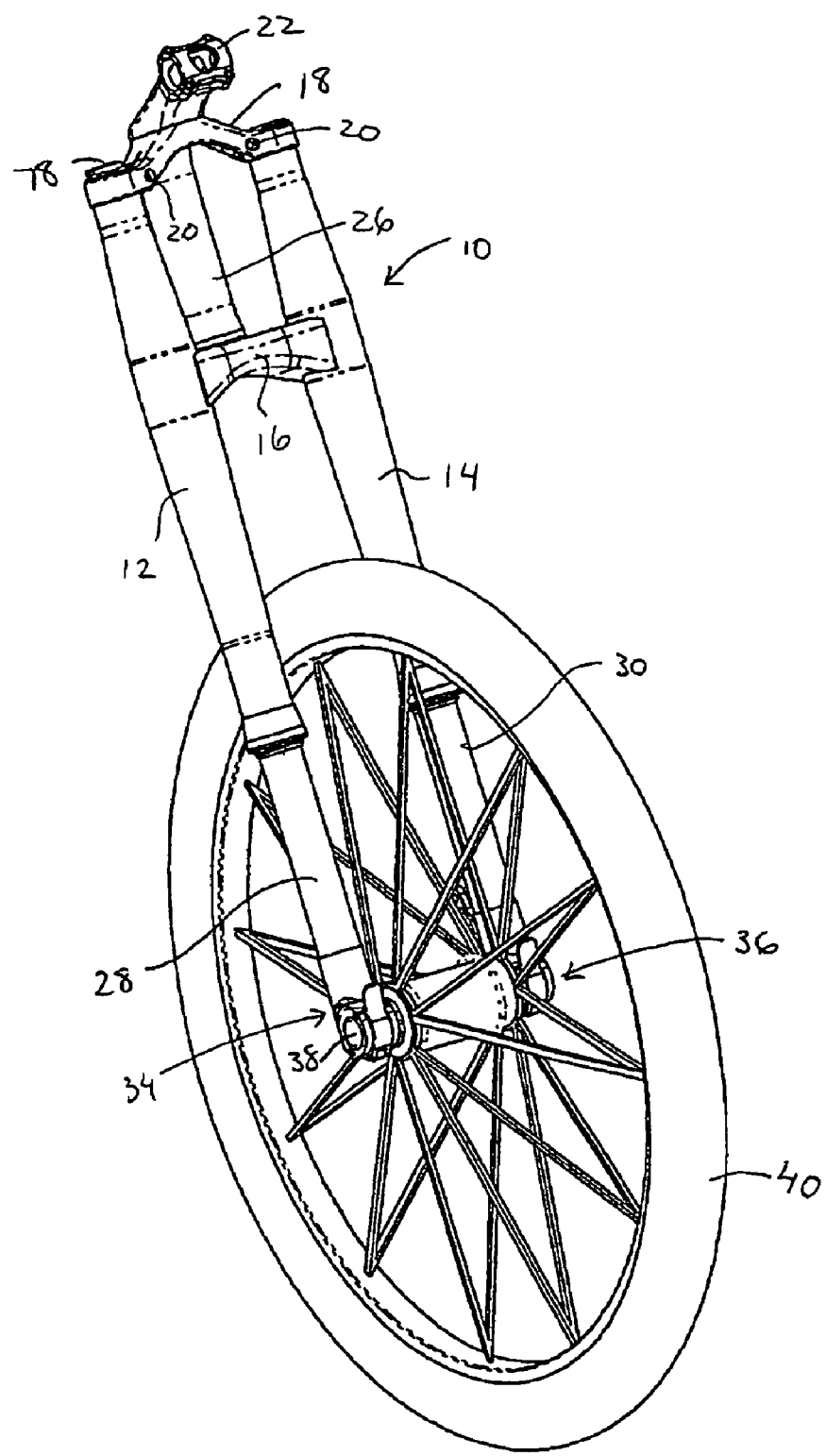
FIG. 1 is a front isometric view of a telescoping fork releasably coupled to a front wheel of a two wheeled vehicle according to the invention.
Figure 2:
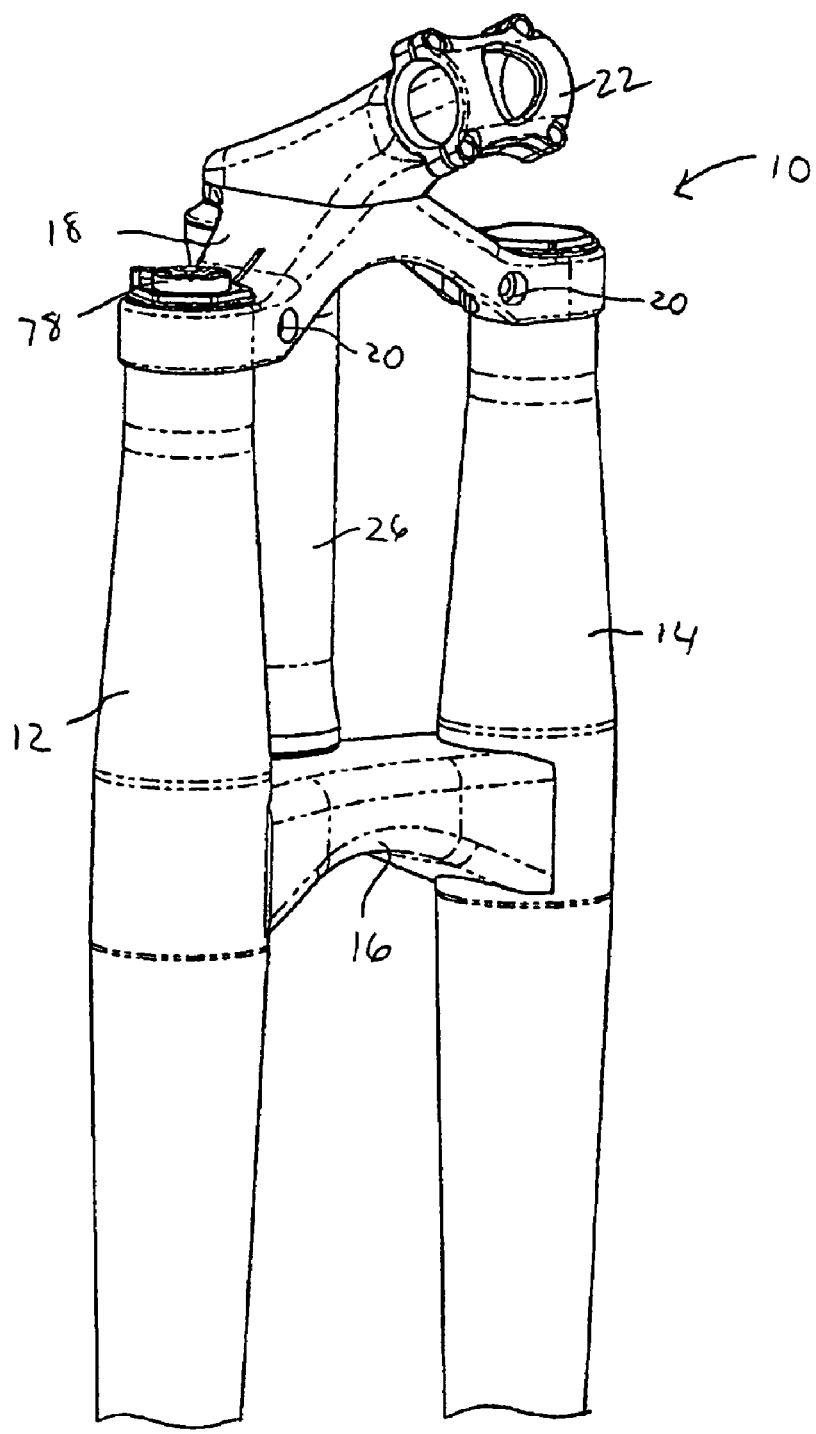
FIG. 2 is a more detailed view of a top portion of the fork of FIG. 1.
Figure 3:
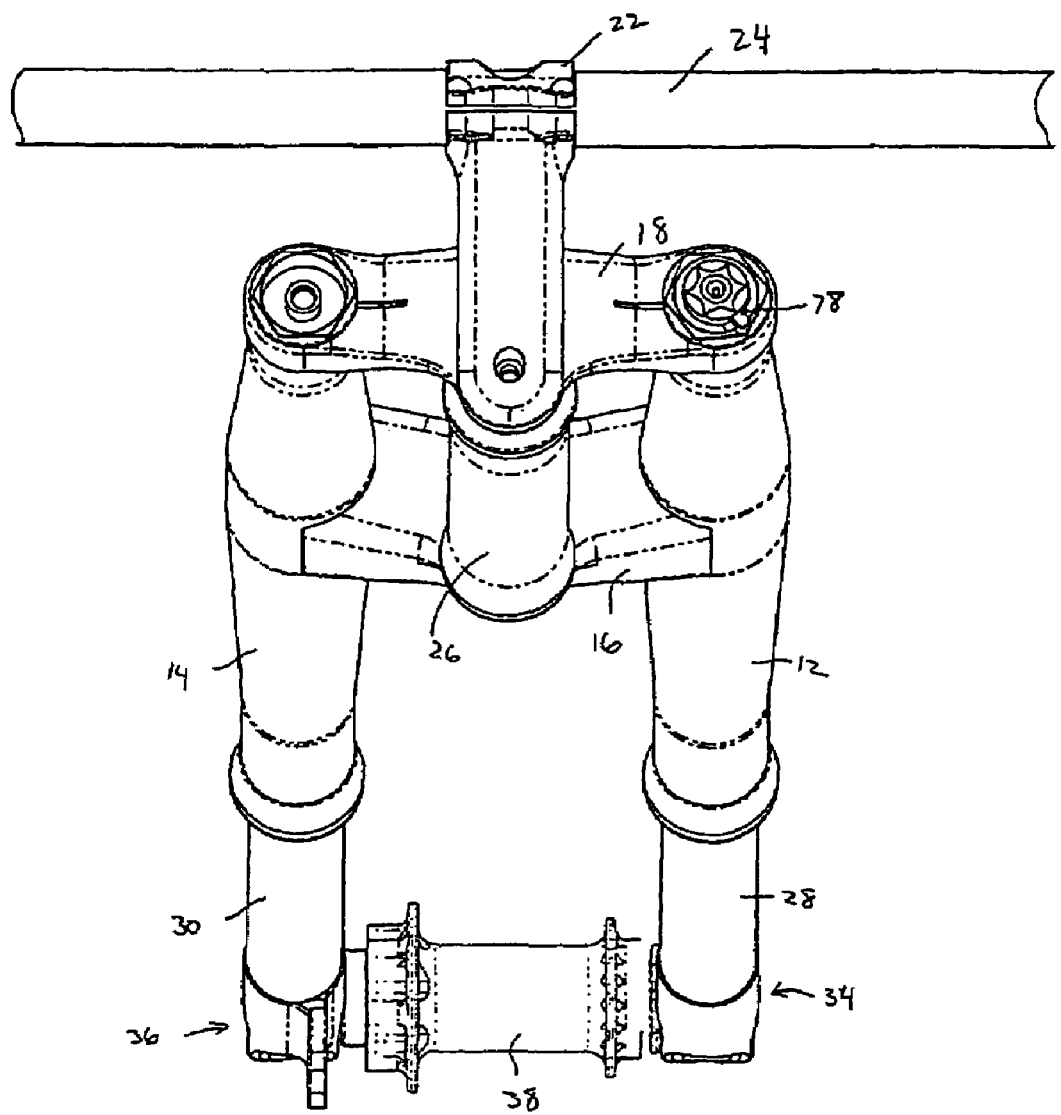
FIG. 3 is a rear isometric view of the fork of FIG. 1 shown coupled to a handle bar.

Referring now to FIG. 1, one embodiment of a fork 10 of a wheeled vehicle will be described. Fork 10 is constructed of a pair of outer tubes 12 and 14 that may both be fashioned in a substantially similar manner. Outer tubes 12 and 14 are coupled together by a lower structural member 16 and an upper structural member 18. Outer tubes 12 and 14 may be constructed of a strong and rigid material, such as steel, aluminum, or the like. Lower structural member 16 may be constructed of a similar material and may be welded to outer tubes 12 and 14. Upper structural member 18 may be coupled to tubes 12 and 14 using screws 20 (see also FIG. 2) that may be tightened or loosened using an allen wrench. Alternatively, upper structural member 18 may be welded to tubes 12 and 14. Upper structural member 18 also includes a coupling arrangement 22 for coupling a handlebar 24 (see FIG. 3) to fork 10. Optionally, this may be incorporated directly into upper structural member 18.

Coupled between structural members 16 and 18 is a rotatable member 26 having steering bearings. Rotatable member 26 is a steering column that is configured to be coupled to a vehicle frame as is known in the art to complete the vehicle.

Extending out of outer tubes 12 and 14 are inner tubes 28 and 30. Inner tubes 28 and 30 are slidable within outer tubes 12 and 14 and are coupled to a clamping system 34, 36 as described hereinafter. As also described hereinafter, an adjustment knob 78 is at a top end of outer tube 12 and may be used to adjust the amount of extension of inner tubes 28 and 30 out of outer tubes 12 and 14.

Coupled to inner tubes 28 and 30 are clamp systems 34 and 36 that can be each substantially identical. Clamp systems 34 and 36 are employed to couple an axle 38 of a wheel 40 to fork 10 and will be described in greater detail hereinafter.

Figure 4:
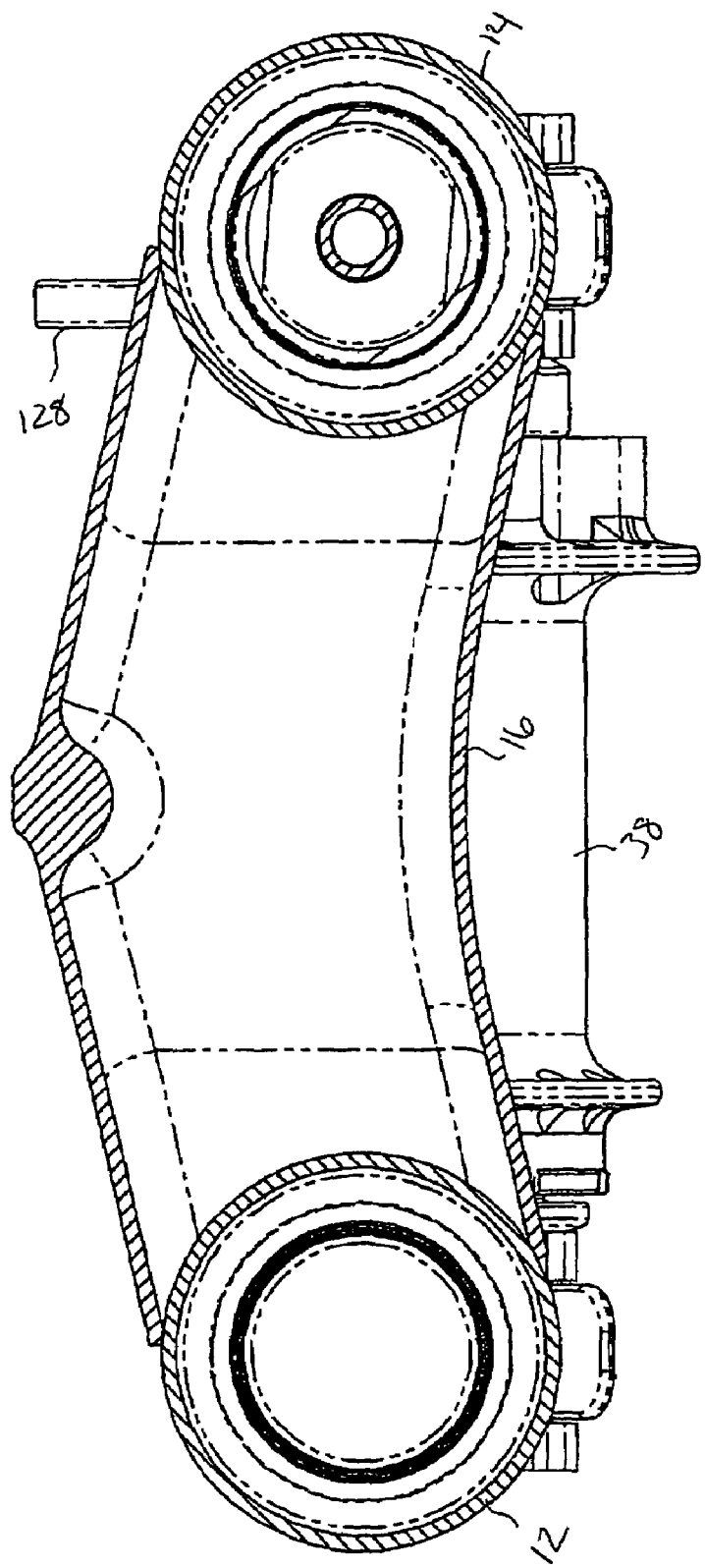
FIG. 4 is a cross-sectional top view of the fork of FIG. 1 taken through a lower structural member.

Lower structural member 16 is shown in cross section in FIG. 4 and has a box sectional shape. Such a shape is useful in that it provides the greatest amount of rigidity for the least weight.

Figure 5:
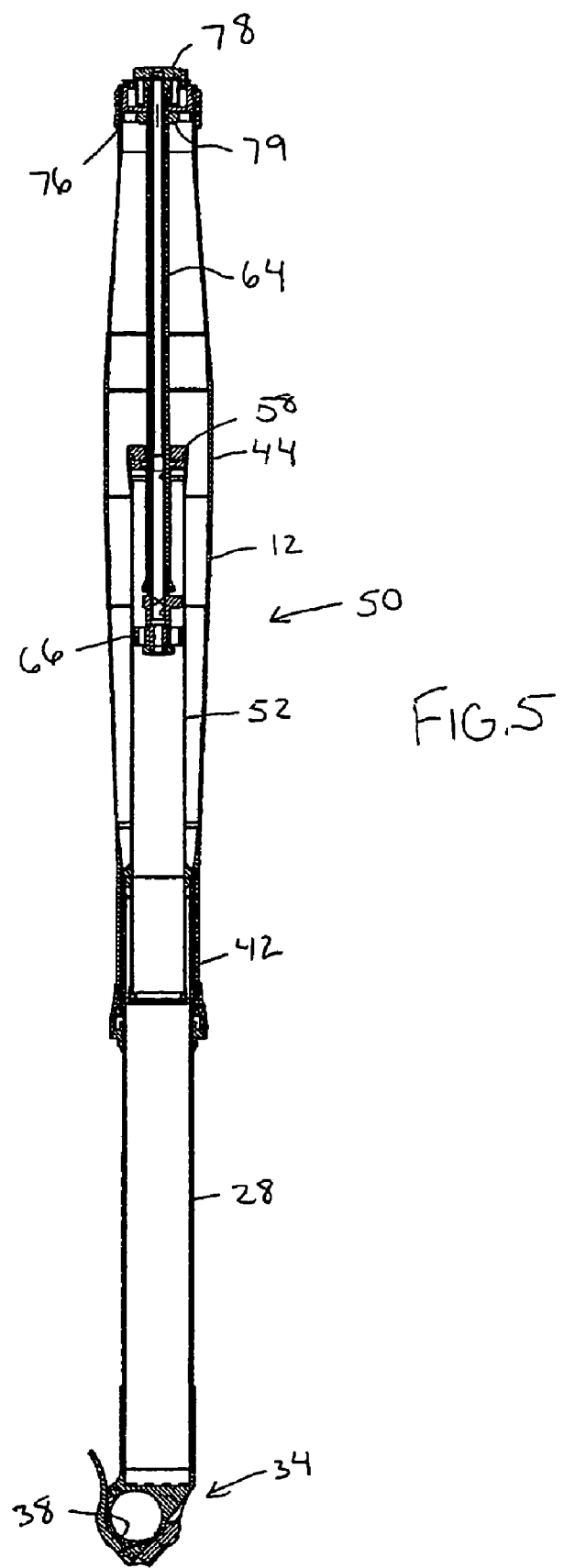
FIG. 5 is a cross-sectional side view of the fork of FIG. 1.

As best shown in FIG. 5, outer tube 12 (as well as outer tube 14) tapers outward, both externally and internally, from near its bottom end 42 to a location 44 where tube 12 is coupled to lower structural member 16 (see FIG. 1). Outer tube 12 also tapers outward, both externally and internally from its top end to location 44. This configuration permits outer tube 12 to have an inner diameter at bottom end 42 that is slightly larger than inner tube 28, and to have a greater inner diameter at location 44 where greater stresses occur. In this way, the overall strength of fork 10 is increased. Further, by also increasing the outer diameter of tube 12, a relatively small wall thickness may be maintained to reduce the weight of fork 10.

Figure 6:
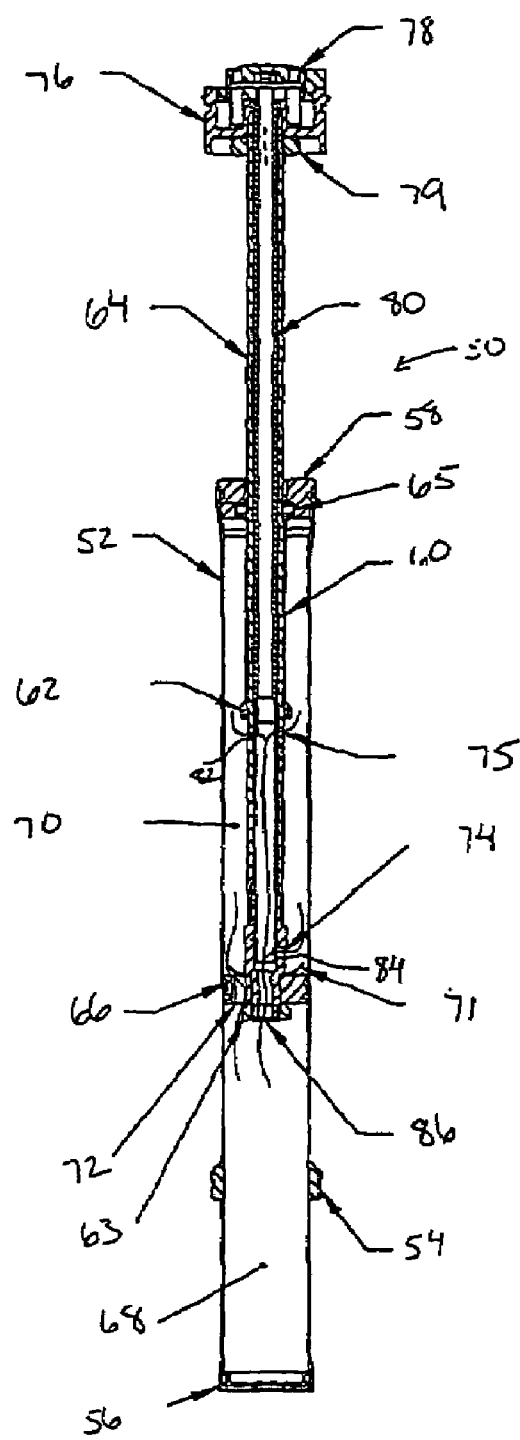
FIG. 6 is a more detailed view of some of the components of the fork of FIG. 5 showing fluid flow during compression.
Figure 7:
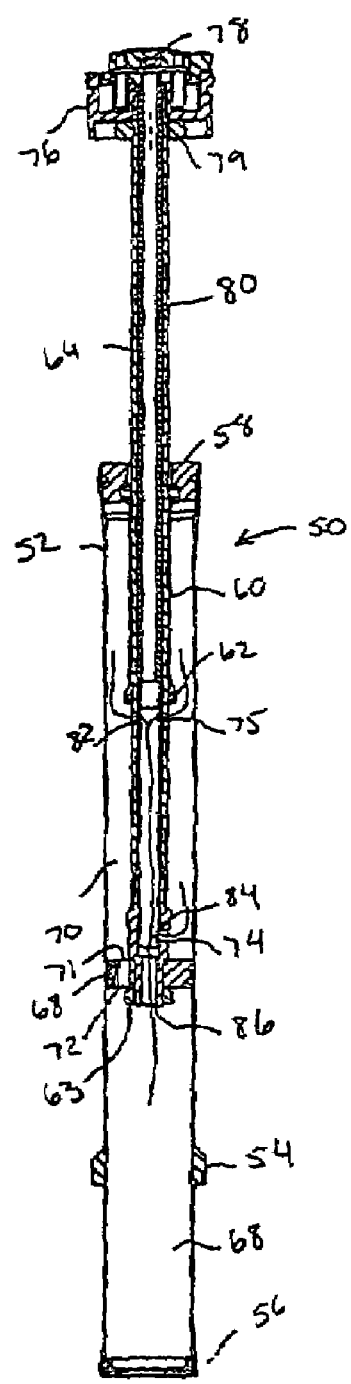
FIG. 7 illustrates the components of FIG. 6 showing fluid flow during extension.

Referring to FIGS. 5-7, construction and operation of a damping system 50 will be described. Damping system 50 is constructed out of outer tube 12 and inner tube 28 that slides within outer tube 12. Inner tube 28 is coupled to a damper tube 52 that has threads 54 that thread into corresponding threads of inner tube 28. Damper tube 52 has a closed bottom end 56 and a top end having a seal head 58. In some cases, damper tube 52 may simply be an integrally formed extension of inner tube 28. Extending down from seal head 58 and into damper tube 52 is an outer sleeve 60. An O-ring 62 is coupled to the bottom end of outer sleeve 60. Extending through outer sleeve 60 and seal head 58 is a hollow damper rod 64. An O-ring 65 provides a seal between seal head 58 and damper rod 64. Coupled to a bottom end of damper rod 64 by a nut 63 is a damper valve piston 66 that is configured as a one-way valve. Piston valve 66 also divides damper tube 52 into a lower oil chamber 68 and an upper oil chamber 70, although other fluids may be used as well. Piston valve 66 includes a flexible valve washer 71 that is shown in an open position in FIG. 6 during compression of damping system 50 to permit fluid flow through a valve 72. As shown in FIG. 7, washer 71 is an a closed position during extension of damping system 50 to prevent flow through orifice 72. Disposed above piston valve 66 is a bottom extension orifice 74 (although more than one may be used). Also, positioned above bottom orifice 74 is one or more top extension orifices 75.

Coupled to a top end of damper tube 64 is a top cap 76 that in turn is coupled to outer tube 12 (see FIG. 5). A bottom out pad 79 is coupled to top cap 76 and may comprise an O-ring. Pad 79 is used to soften the impact and protect top cap 76 if damping system 50 bottoms out, i.e., when seal head 58 reaches top cap 76. Optionally, pad 79 may be provided anywhere along damper rod 64, and damper rod 64 may be provided with a shoulder to hold pad 79 in place. Disposed on top of top cap 76 is an adjuster knob 78 that in turn is coupled to a lock tube 80. In turn, lock tube 80 is adjacent to and coaxially disposed within damper rod 64. Knob 78 is rotatable to rotate lock tube within damper rod 64. Lock tube 80 also includes a set of upper orifices 82 that are aligned with top orifices 75 of damper rod 64. Orifices are preferably configured as slots so that when knob 78 is rotated, a fluid flow path remains through damper rod 64 and lock tube 80.

Lock tube 80 also includes a lower orifice 84 that is aligned with bottom extension orifice 74 of damper rod 64. Upon rotation of knob 78, orifice 84 may be rotated out of alignment with orifice 74 so that fluid flow between upper oil chamber 70 and the interior of damper rod 64 through orifice 74 is prevented when orifice 75 passes above O-ring 62. Damper rod 64 also includes an opening 86 at its bottom end that permits fluid to flow both into and out of damper rod 64.

By utilizing lock tube 80, damper system 50 may be operated in one of two modes simply by rotating knob 78. In FIGS. 6 and 7, damper system 50 is shown in an unrestricted mode where orifice 84 is aligned with orifice 74. In FIG. 6, damper system 50 is being compressed, such as when a rider encounters a bump. In such cases, inner tube 28 slides into outer tube 12. Since damper tube 52 is coupled to inner tube 28 and top cap 76 is coupled to outer tube 12, damper rod 64 and lock tube 80 move further into damper tube 52. In so doing, the fluid within lower chamber 68 moves upwardly through valve orifice 72 and into upper chamber 70, as well as upwardly through damper rod 64 as shown by the flow lines in FIG. 6. The fluid flowing upward through damper rod 64 may exit into upper chamber 70 through orifices 74 or 75 as shown. The "stiffness" of damping system 50 during compression may be varied by varying the flexibility of valve washer 71, as well as the number and/or size of the exit orifices.

During extension (as shown in FIG. 7), valve washer 71 is forced downward to close orifice 72. As such, fluid in upper chamber 70 may only pass into lower chamber 68 through damper rod 64 as shown by the flow lines. If the amount of extension becomes so great that orifices 75 move within outer sleeve 60, fluid in upper chamber 70 may still pass into lower chamber 68 through orifices 74 and 84.

Damper system 50 may be placed into an extension limiting mode by simply turning knob 78 until orifice 84 is out of alignment with orifice 74. In this configuration, lock tube 80 prevents fluid flow through orifice 74 and into damper rod 64. Hence, once damper system 50 extends sufficient to move orifice 75 beyond O-ring 62, outer sleeve 60 prevents fluid flow from upper chamber 70 and into damper rod 64 via orifice 75. Moreover, because orifice 74 also is closed, none of the fluid in upper chamber 70 may pass into lower chamber 68 is prevented, thus stopping further extension.

Hence, a rider may quickly and easily control the amount of extension simply by rotating knob 78 which is easily accessible since it is outside of outer tube 12. For example, when climbing a hill a rider may want to keep the front end of the bicycle closer to the ground. To do so, knob 78 may simply be turned to limit the amount of extension. When at the top of the hill, knob 78 may be moved back to place damping system 50 in normal operation. As will be appreciated, the amount of extension may also be controlled by the number, size and/or location of orifices 75. For example, by moving orifices downward, more extension may be achieved.

Figure 8:
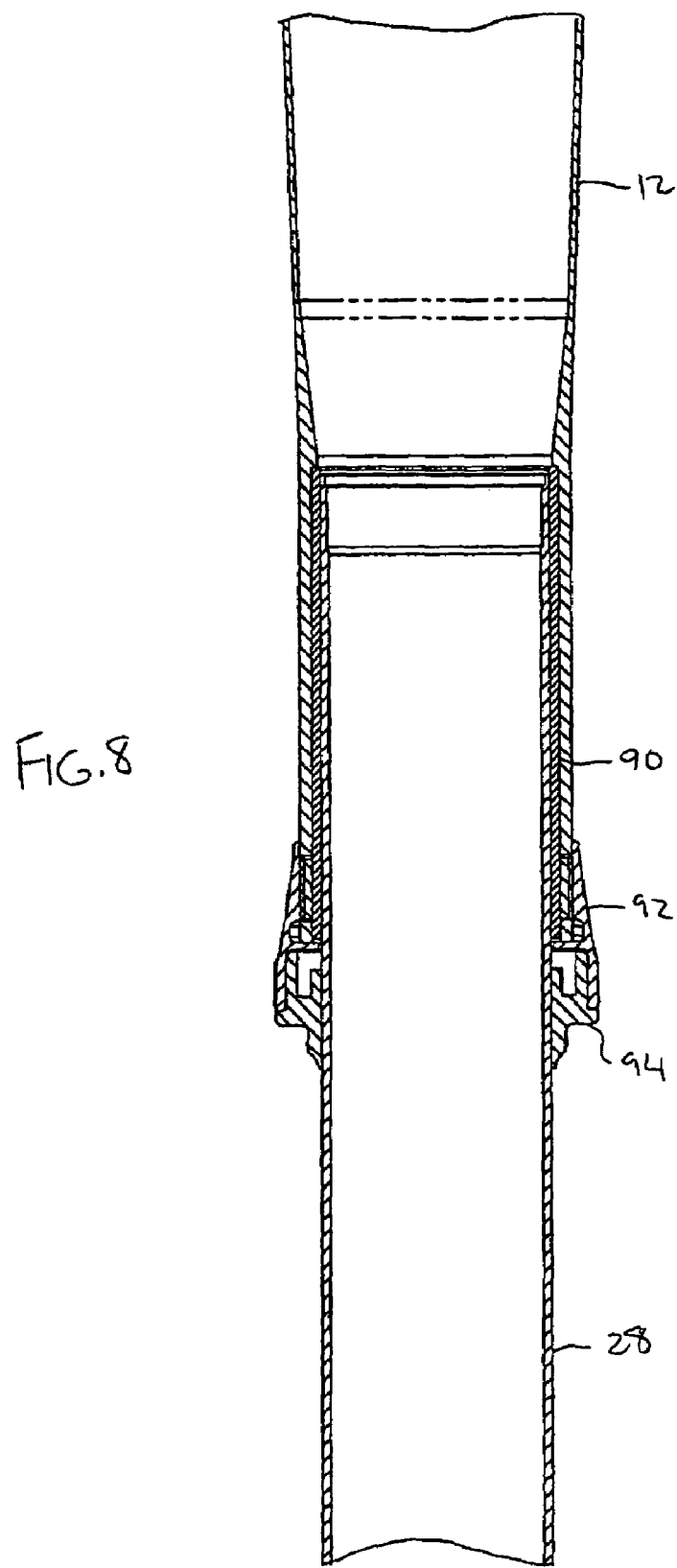
FIG. 8 is a more detailed view of a bushing disposed between an outer tube and an inner tube.
Figure 9:
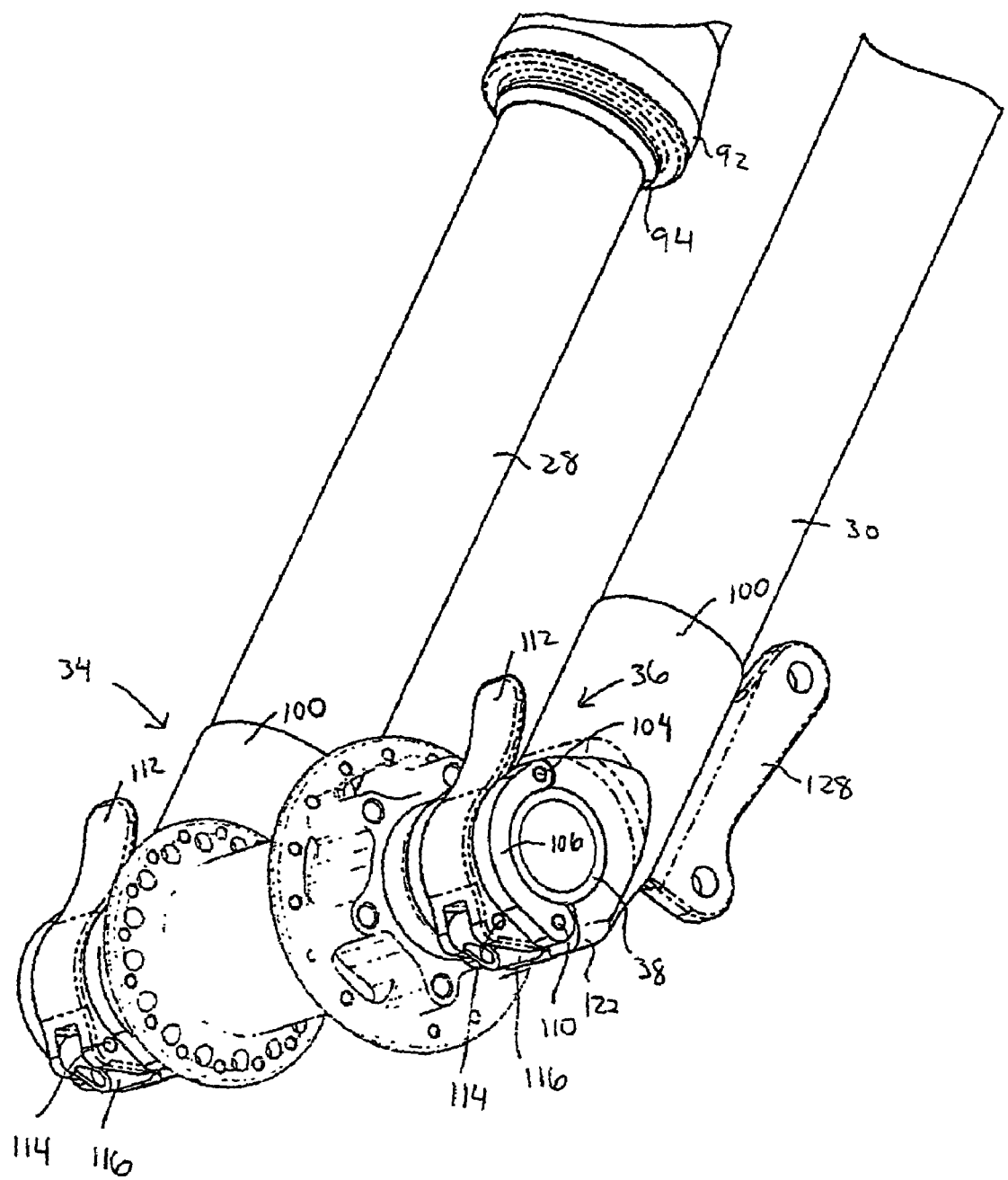
FIG. 9 is a more detailed view of a clamp system of the fork of FIG. 1.

FIG. 8 illustrates the slidable connection between inner tube 28 and outer tube 12. For convenience of illustration, damper system 50 has been removed. Coupled to outer tube 12 is a bushing 90 that is held in place by a sheath member 92. Also coupled to sheath member 92 is a seal or dust wiper 94 that helps prevent dirt and other particulate from passing between inner tube 28 and outer tube 12. Bushing 90 is configured to maintain a layer of oil between itself and inner tube 28 during compression and expansion This is accomplished by using only a single bushing so that edges do not exist between multiple bushings. Further, bushing 90 has a length that is longer than the diameter of inner tube 28. This length also helps to maintain the oil layer.

Figure 10:
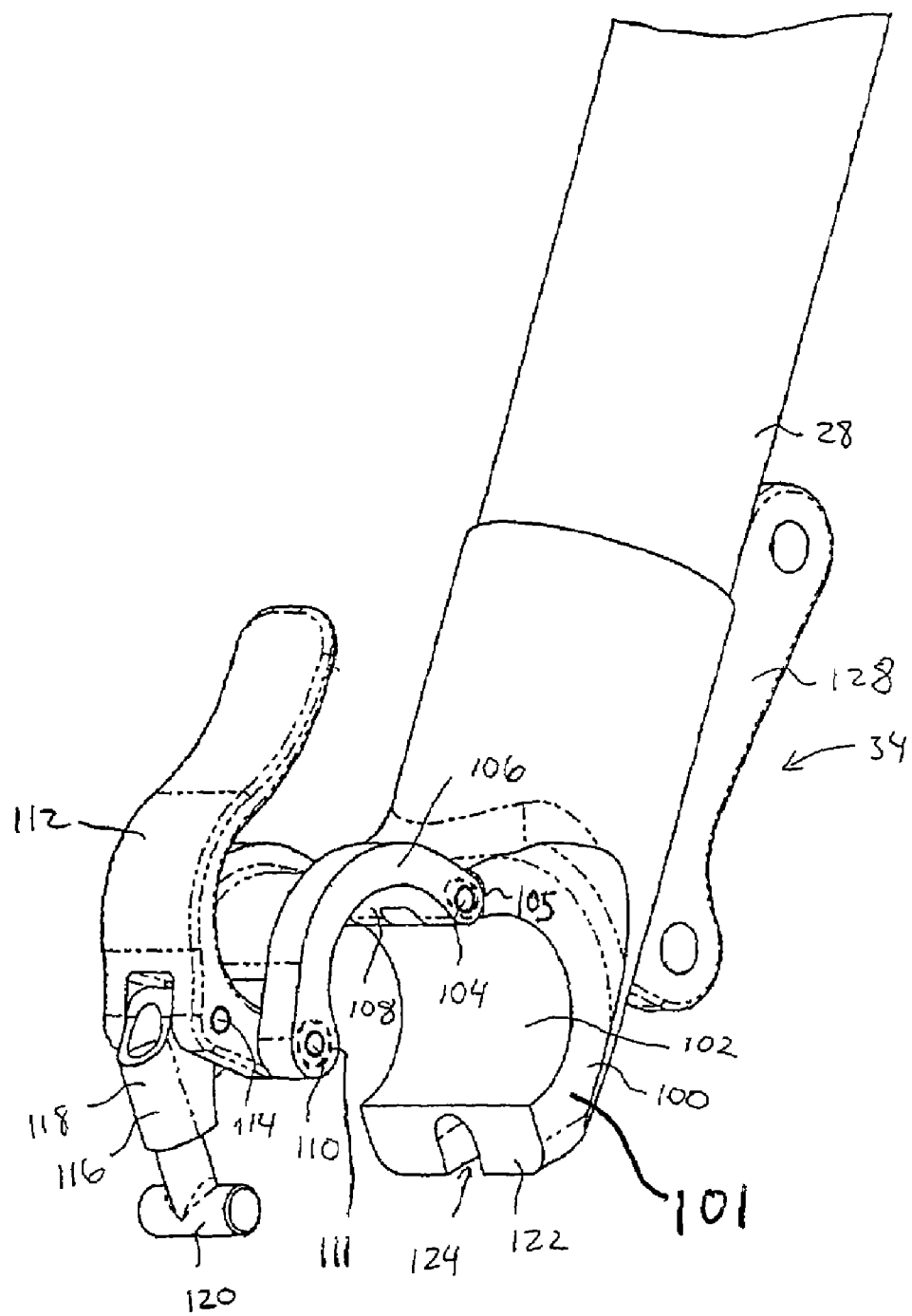
FIG. 10 illustrates the clamp system of FIG. 9 in an open position.

Referring now to FIGS. 9-12, clamp systems 34 and 36 will be described in greater detail. Clamp systems 34 and 36 can be constructed of identical components and will each be described using the same reference numerals. Clamp system 34 is constructed of a frame member 100 that is coupled to inner tube 28. Frame member 100 has an inner surface 102 for receiving wheel axle 38 and may be approximately semi-circular in shape, although other shapes are possible. Also, frame member 100 may have a shape for receiving other wheel components, such as a spacer. Pivotally attached to frame member 100 by a pivot pin 104 is a cover plate 106 that also has an inner surface 108 for receiving the other half of wheel axle 38. As such, inner surface 108 may also be approximately semi-circular. Pivotally coupled to cover plate 106 by a pivot pin 110 is a lever 112, and pivotally coupled to lever 112 by a pivot pin 114 is a hook member 116. Hook member 116 is constructed of a housing 118 and a hook 120 that is T-shaped. Hook 120 is threadably connected to housing 118 to permit the distance between hook 120 and lever 112 to be adjusted. As shown in FIG. 10, frame member 100 can include a front fork tip 101.

Figure 11:
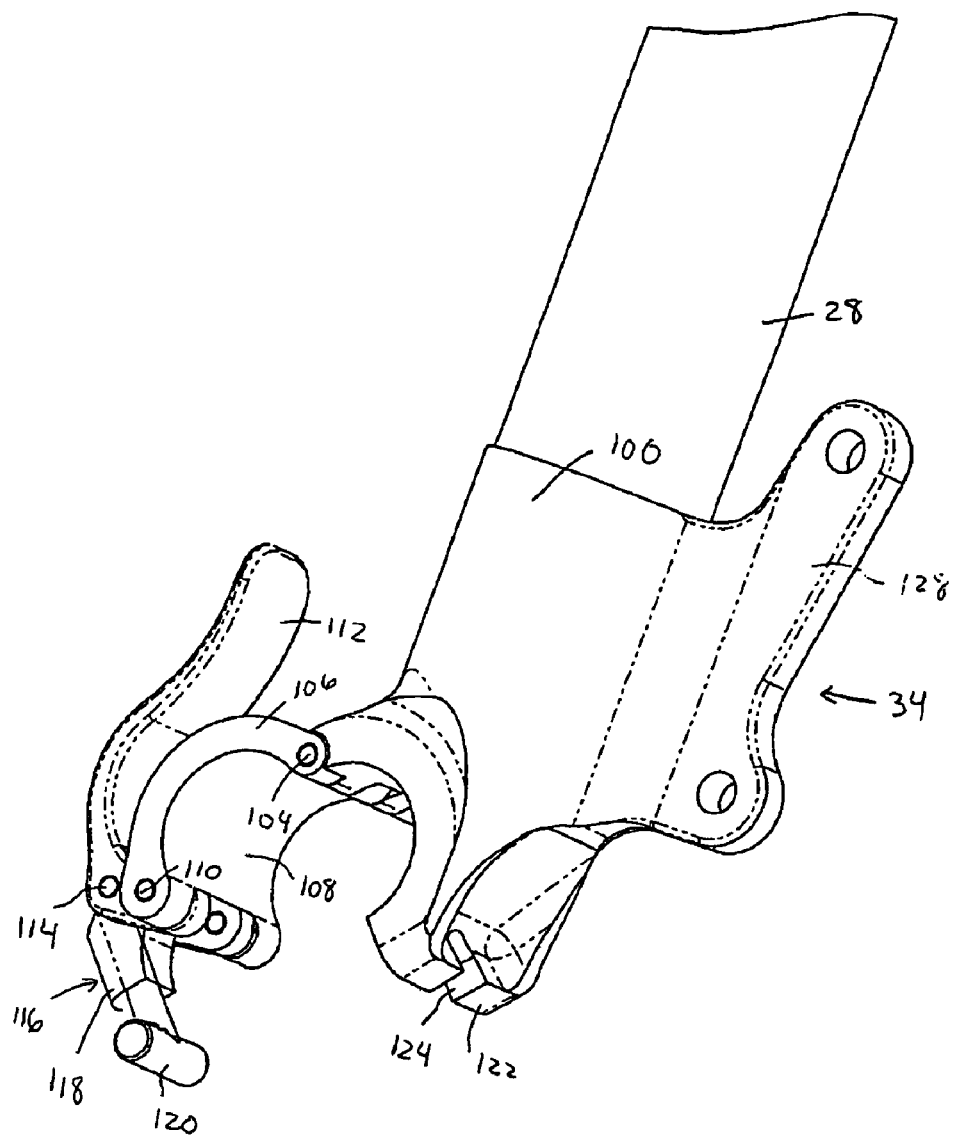
FIG. 11 is another view of the clamp system of FIG. 10.
Figure 12:
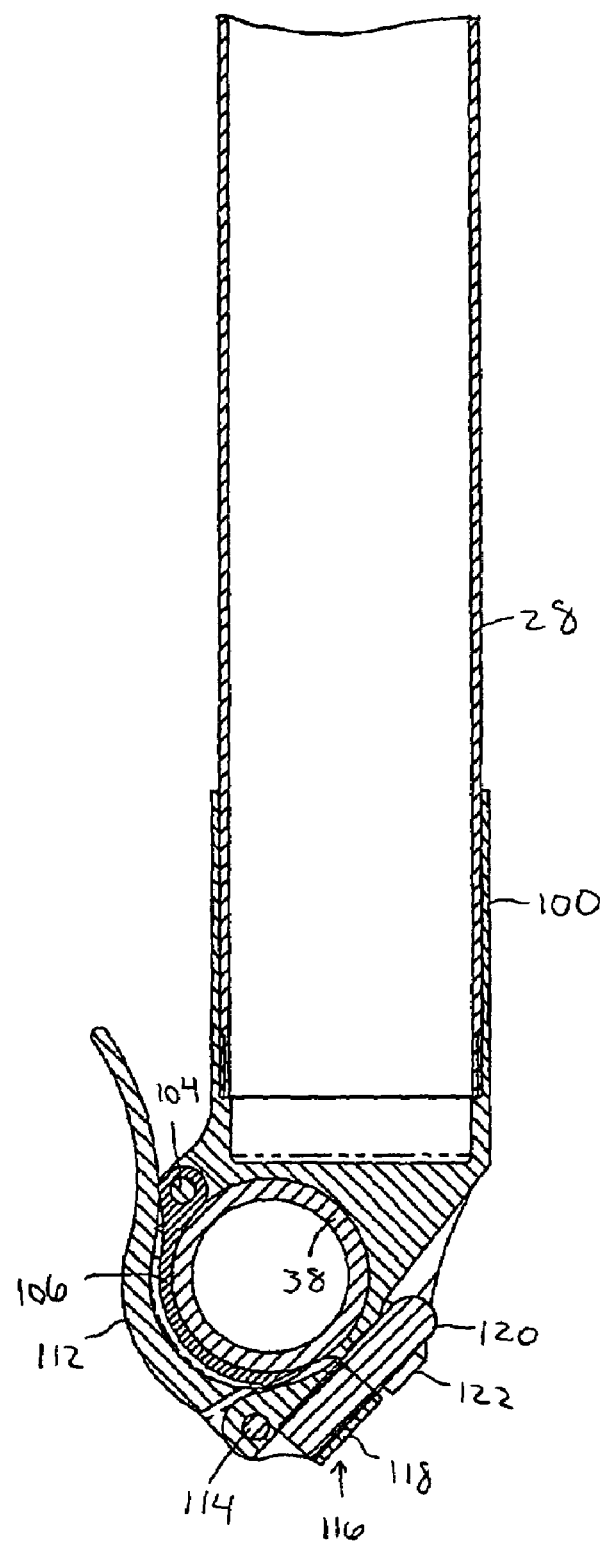
FIG. 12 is a cross sectional side view of the clamp system of FIG. 9.

Frame member 100 includes a shoulder 122 having a slot 124 for receiving hook 120 when clamping wheel axle 38 to frame member 100. In use, wheel 40 (see FIG. 1) may be coupled to inner tube 28 by placing clamp system 34 in an open position as shown in FIGS. 10 and 11. Torsion springs 105 and 111 may be provided about pivot pins 104 and 110 to hold clamp system 34 in the open position. Wheel axle 38 may then be moved vertically up and placed adjacent inner surface 102. This is made possible by locating cover plate 106 at the top end of inner surface 102. Lever 112 may then be operated to pivot cover plate 106 about the other half of wheel axle 38 and to place hook 120 into slot 124 so that the end of hook is beyond shoulder 122. Lever 112 is then rotated until pivot pin 114 moves to an over center position (i.e., past a line passing between pin 110 and hook 120) and locks cover plate 106 in place where wheel axle 38 is clamped in place by surfaces 102 and 108 as shown in FIG. 12. To adjust the clamping force, hook 120 may be screwed further into or out of housing 118. When ready to remove wheel 40, lever 112 is simply pulled and hook 120 is removed from slot 124. A similar process is used to operate clamp system 36.

Also coupled to frame member 100 is a mount 128 that may be employed to mount a disc brake caliper to clamp system 34. Such a disc brake caliper may be similar to those known in the art, e.g., as defined by the G-3 Shimano disc brake standard.

Figure 13:
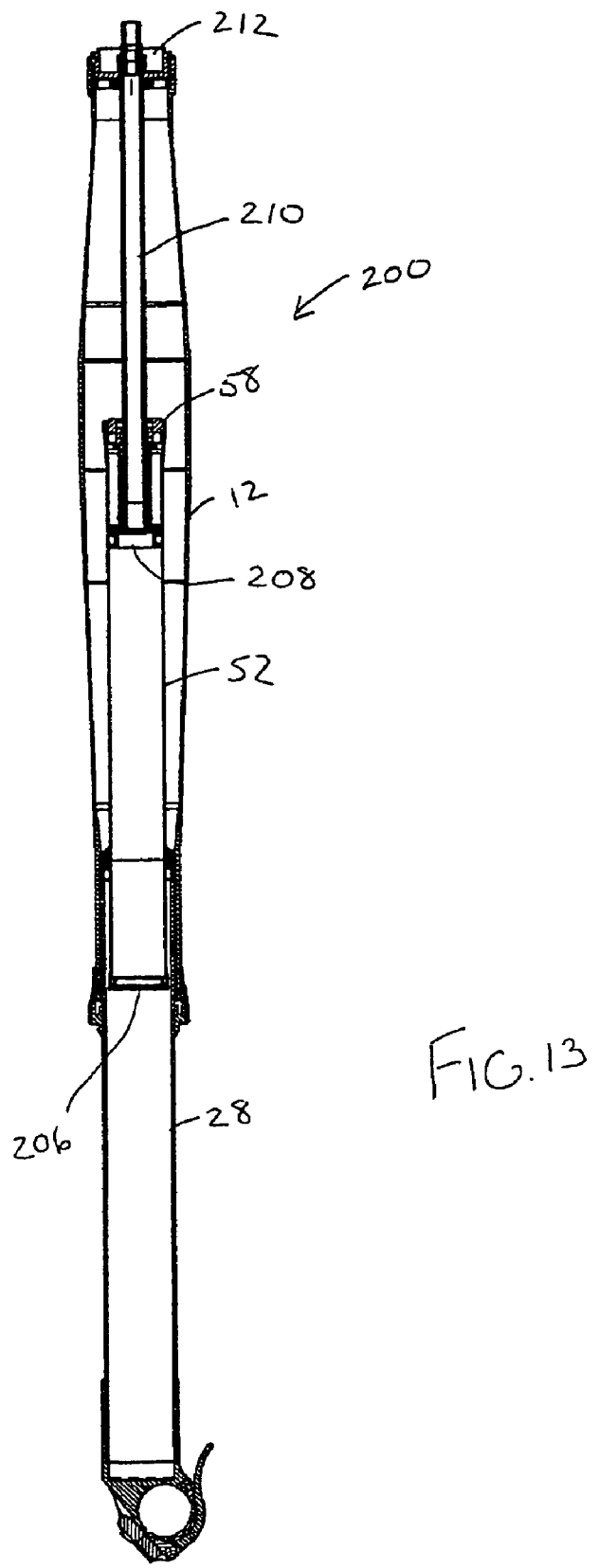
FIG. 13 is a cross-sectional side view of an alternative fork section according to the invention.
Figure 14:
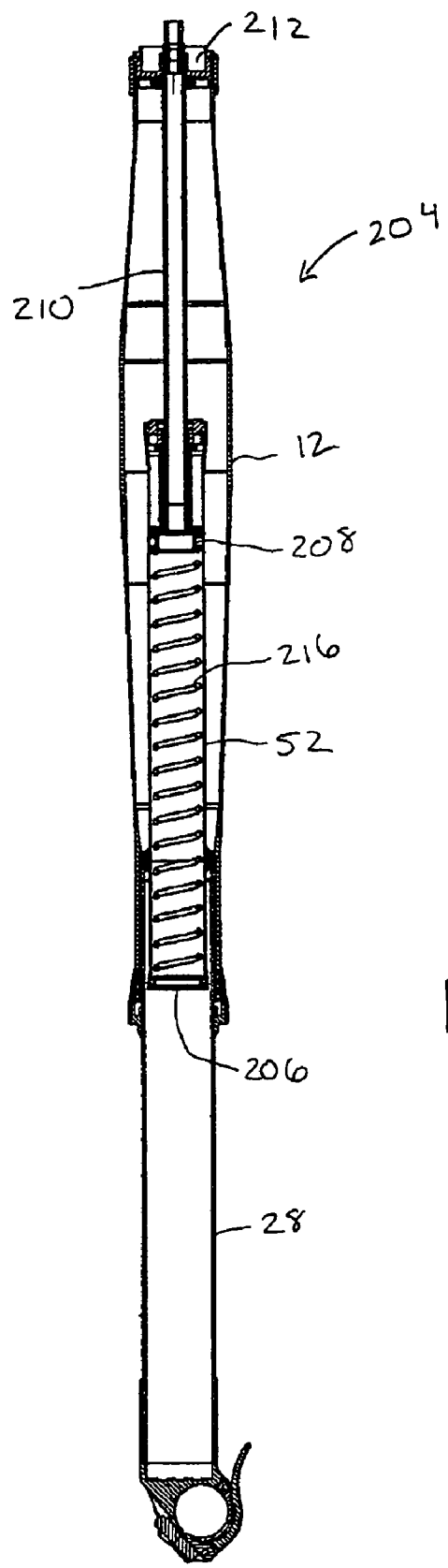
FIG. 14 is a cross-sectional side view of a further embodiment of a fork section according to the invention.

Fork 10 may be modified to include other types of damping systems. Two such examples are illustrated in FIGS. 13 and 14. For convenience of discussion, the elements in FIGS. 13 and 14 that are similar to those described in connection with fork 10 will be described using the same reference numerals. FIG. 13 illustrates a fork section 200 that is constructed of an outer tube 12 that may be connected to the outer tube of another fork section. For example, a fork may be constructed of fork section 200 that is coupled to the outer tube 12 of a fork section 204 (see FIG. 14) in a manner similar to the embodiment illustrated in FIG. 1. Outer tubes 12 may taper outwardly in a manner similar to that previously described.

Slidable within outer tube 12 is inner tube 28 (that is coupled to damper tube 52). In some cases, inner tube 28 and damper tube 52 may be the same tube. Damper tube 52 includes a closed end 206, and a sealed piston 208 is slidable within tube 52. A hollow rod 210 is connected to piston 208 at its bottom end and is coupled to the top of outer tube 12 at its top end. The top end of outer tube 12 includes a valve region 212 into which a valve may be disposed. This valve permits the gas pressure in the space between piston 208 and closed end 206 to be adjusted.

Hence, fork section 200 functions as a damper to dampen a shock experienced by the two wheeled vehicle. More specifically, as inner tube 28 slides into outer tube 12, the gas in damper tube 52 is compressed to provide a damping effect.

Fork section 204 of FIG. 14 is essentially identical to that of fork section 200 but includes a spring 216 that provides a biasing effect. Hence, fork section 204 may be used in combination with fork section 200 to provide a fork having both a damping and biasing effect. More specifically, after the fork experiences a shock and is compressed, spring 216 forces inner tube 28 out of outer tube 14.

It is appreciated that the releasable clamp systems and methods of the present invention can involve coupling a wheel axle with any of a variety of frame members, including fork tips, dropouts, and the like. In some cases, a dropout can be defined as a slot or other frame member on a bicycle to which the wheel axle is attached. Horizontal dropouts, which are often used in single-speed bicycles, can allow adjustment of chain tension and accommodation of a range of chain lengths or cog sizes. Vertical dropouts typically involve another means of chain-tensioning, such as a derailleur or chain tensioned. In many cases, a frame member such as a fork tip is attached to or integral with a front fork, and a frame member such as a dropout is attached to or integral with a rear chain stay. Although the frame member is often clamped directly to the wheel axle, it is appreciated the frame member may be coupled with the wheel axle via another intervening wheel component, such as a hub spacer that is circumferentially disposed about the wheel axle. As such, the invention contemplates clamping systems that clamp to a wide variety of wheel components, and not just directly to the wheel axle.

Figure 15A:
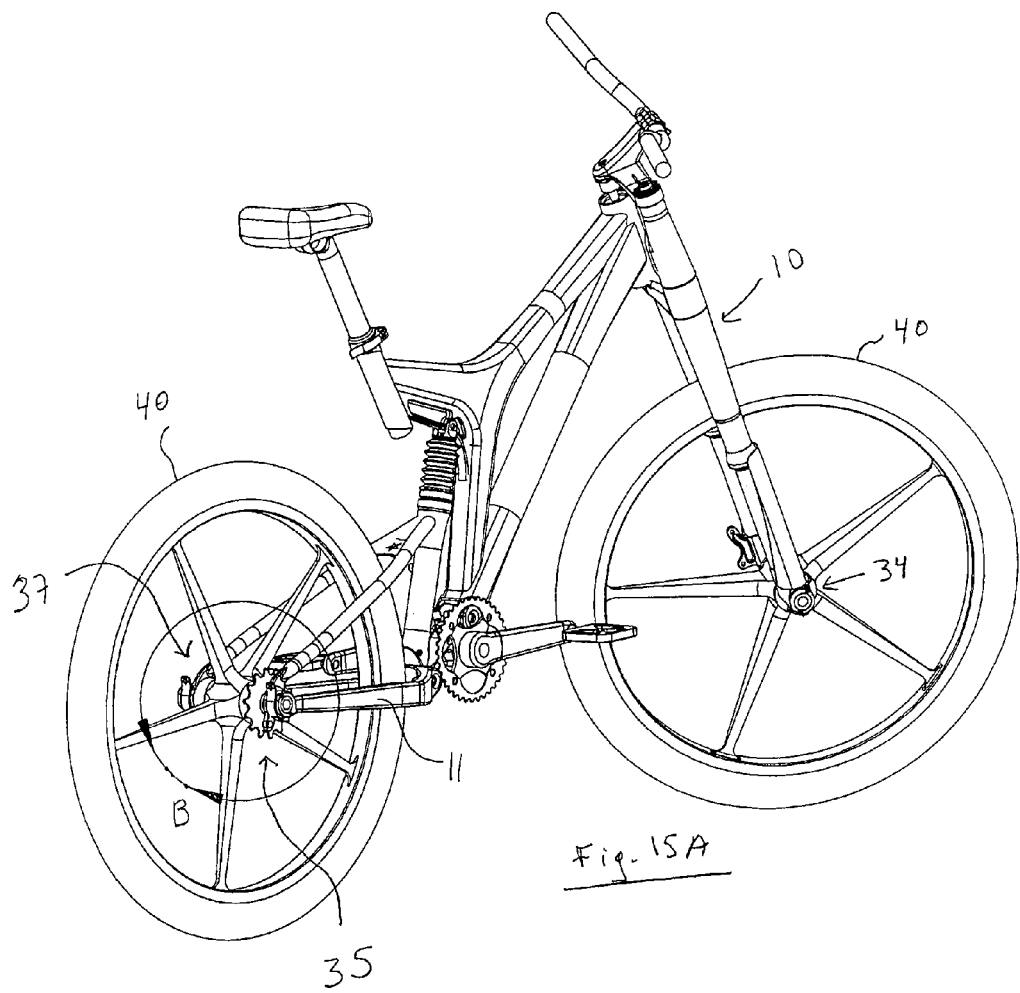
Figure 15B:
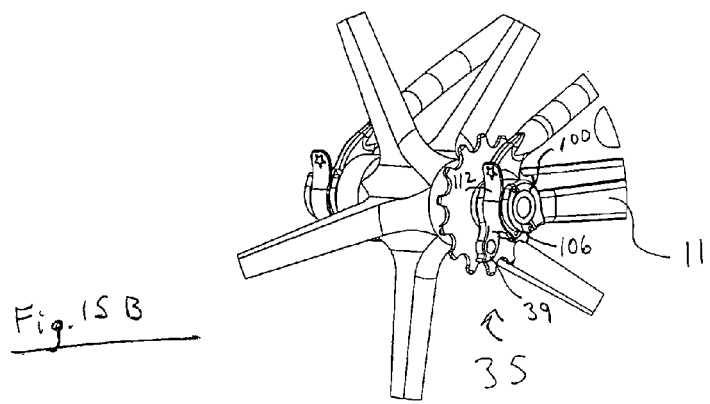
Figure 15C:
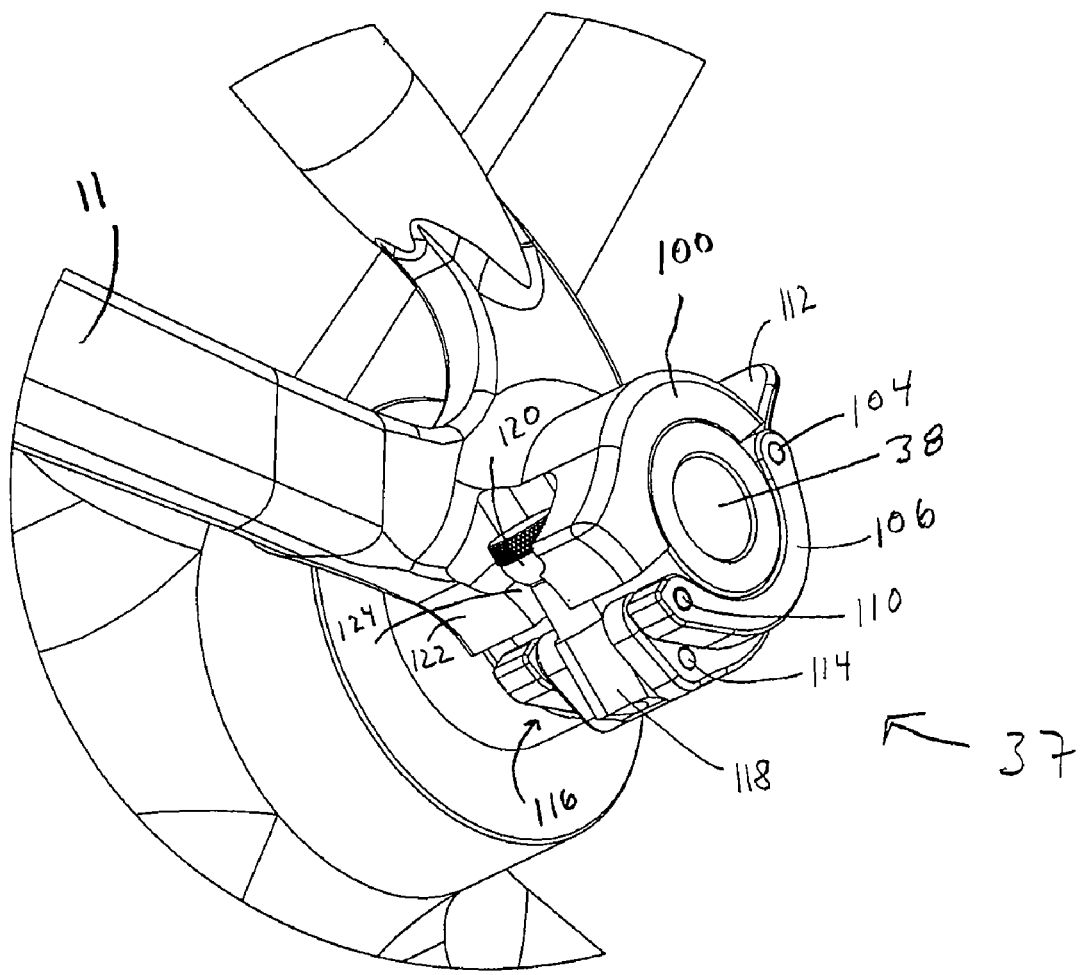

As seen in FIG. 15A, a wheeled vehicle such as a bicycle may include clamp systems 34 and 36 (not shown) for releasably clamping wheel 40 with a suspension member such as fork 10. The wheeled vehicle may also include clamp systems 35 and 37 for releasably clamping wheel 40 with a suspension member such as a chain stay 11. As seen here, clamp system 35 is disposed on the drive train side of the vehicle, and clamp system 37 is disposed on the opposite side. To some extent, clamp systems 35 and 37 can be constructed of components common with clamp systems 34 and 36, and thus may be described using the same reference numerals. FIG. 15B is an exploded view of section B of FIG. 15A, and illustrates a rear view of clamp system 35, which includes frame member 100, cover plate 106, and lever 112. A clamp derailleur mounting tab 39 may be coupled with cover plate 106. Likewise, FIG. 15C illustrates a front view of clamp system 37, which includes frame member 100, cover plate 106, and lever 112. FIG. 15D illustrates a front view of clamp system 35 in the closed position, and FIG. 15E illustrates a front view of clamp system 35 in the open position. As seen here, clamp derailleur mounting tab 39 is coupled with a rear derailleur 300. It is also appreciated that in some cases clamp derailleur mounting tab 39 may be coupled with a chain tensioned or other chain guide mechanism. Advantageously, when derailleur 300 is attached with cover plate 106, the operator may find it easier and more efficient to remove and install a wheel when, for example, repairing or replacing a tire or tube, because derailleur 300 can be swung away from frame member 100. As depicted in FIGS. 15A-E, clamp systems 35 and 37 can each include a frame member 100 that is coupled with chain stay 11.

The present invention contemplates that frame member 100 can be coupled with any of a variety of suspension members, such as forks, chain stays, seat stays, swingarms, and the like. Frame member 100 can have an inner surface 102 for receiving or contacting a portion of wheel axle 38 and may be approximately semi-circular in shape, although other shapes are possible. Cover plate 106 can be pivotally attached with frame member 100, for example, by pivot pin 104. Cover plate 106 can have an inner surface 108 for receiving or contacting another portion of wheel axle 38. As such, inner surface 108 may also be approximately semi-circular. Lever 112 can be pivotally coupled with cover plate 106, for example, by pivot pin 110. Hook member 116 can be pivotally coupled with lever 112, for example, by pivot pin 114. Hook member 116 can be constructed of housing 118 and hook 120. Hook 120 can have a T-shaped geometry, a ball shaped geometry, or any other geometry that provides a mechanism whereby hook 120 can be anchored in association with shoulder 122 and slot 124, or otherwise engaged or secured to frame member 100. Hook 120 can be threadably connected with housing 118 to permit the distance between hook 120 and lever 112 to be adjusted. It is appreciated that in addition to As seen in, for example, FIG. 15C, hook 120 can have a semi-spherical geometry and a knurled surface 121 whereby an operator can manually grasp and rotate hook 120, thus adjusting the distance between hook 120 and housing 118.

The present invention provides a lever that is easily adjusted, in comparison with levers of other known systems that are more apt to hit a frame member when tightening. Moreover, the present invention provides a hook member and shoulder/slot combination that can easily shed mud or dirt. Other known release mechanisms use small pocket features that retain mud and dirt, and which can make operation of the mechanism difficult or impossible, thus causing problems on the field. Relatedly, the pocket features of the known systems can be difficult to access or clean. The present invention also provides a lever that can be aligned with the cover plate/frame member, and thus situated close to the wheel. Other known systems often include a lever that is disposed lateral to the clamp, away from the wheel, and thus more prone to accidental release. For example, in mountain biking conditions, such known levers may be more apt to get caught by branches, rocks, and the like. In both mountain and road biking conditions, such known levers may be more apt to get caught by other cyclists (or their bikes) when riding in close proximity. The present invention also provides a lever that allows for a balanced application of torque or load across the pivot pin, in contrast to other known systems that involve application of torque at just one end of a shaft.

In one embodiment, the present invention can include a clamp system configured such that frame member 100 rests on a toward portion of wheel axle 38 when the vehicle is resting on wheel 40. Cover plate 106 can be pivotally attached with frame member 100, and movable between a closed position where cover plate 106 and frame member 100 generally encompass and clamp wheel axle 38, and an open position that permits removal of wheel axle 38. Cover plate 106 can be attached with frame member 100 such that cover plate 106 is placed against a bottomward portion of wheel axle 38 whereby cover plate 106 is movable downward to be removed from wheel axle 38 to allow wheel 40 to be vertically removed from frame member 100. As noted above, frame member 100 and cover plate 106 can also be clamped to an intervening wheel component such as a hub spacer (not shown), which is disposed circumferentially about wheel axle 38. Accordingly, when installing or removing a wheel, an area of frame member 100 can rest directly on a toward portion of wheel axle 38, or frame member 100 may rest an intervening wheel component, which in turn rests on wheel axle 38. In either event, the area of frame member 100 is configured such that frame member 100 is supported by a toward portion of wheel axle 38, either directly, or indirectly such that the intervening wheel component transmits the supporting force from wheel axle 38 to frame member 100.

The present invention also contemplates methods of constructing the clamp systems described herein. For example, an exemplary clamp system can be constructed by pivotally coupling a frame member with a cover plate, pivotally coupling a lever to the cover plate, and pivotally coupling a hook member with the cover plate.

As noted above, frame member 100 can include shoulder 122 with slot 124 for receiving hook 120 when clamping wheel axle 38 to frame member 100. In a method of use, wheel 40 may be coupled with chain stay 11 by placing clamp systems 35 and 37 in an open position as shown in FIG. 15E. Torsion springs 105 and 111 (see, e.g., FIG. 10) may be provided about pivot pins 104 and 110 to hold clamp systems 35 and 37 in the open position. Wheel axle 38 may then be moved vertically up and placed adjacent inner surface 102. This is made possible by locating cover plate 106 at the top end of inner surface 102. In this way, the operator can effectively support all or part of the weight of the vehicle on a toward portion of wheel axle 38 prior to locking the clamp system, which can make the wheel installation process easy and efficient. Lever 112 may then be operated to pivot cover plate 106 about the other half of wheel axle 38 and to place hook 120 into slot 124 so that the end of hook is beyond shoulder 122. Lever 112 is then rotated until pivot pin 114 moves to an over center position (i.e., past a line passing between pin 110 and hook 120) and locks cover plate 106 in place where wheel axle 38 is clamped in place by surfaces 102 and 108 as shown, for example, in FIG. 15C. To adjust the clamping force, hook 120 may be screwed further into or out of housing 118. When ready to remove wheel 40, lever 112 is simply pulled and hook 120 is removed from slot 124. These steps may be used to operate both clamp systems 35 and 37. It is appreciated that in addition to the cooperative association between hook member 116, shoulder 122, and slot 124, the present invention contemplates any of a variety of means for securing cover plate 106 in a closed position so as to clamp wheel axle 38 in place, as well as for adjusting the force applied by the clamp system to wheel axle 38.

Figure 16A:
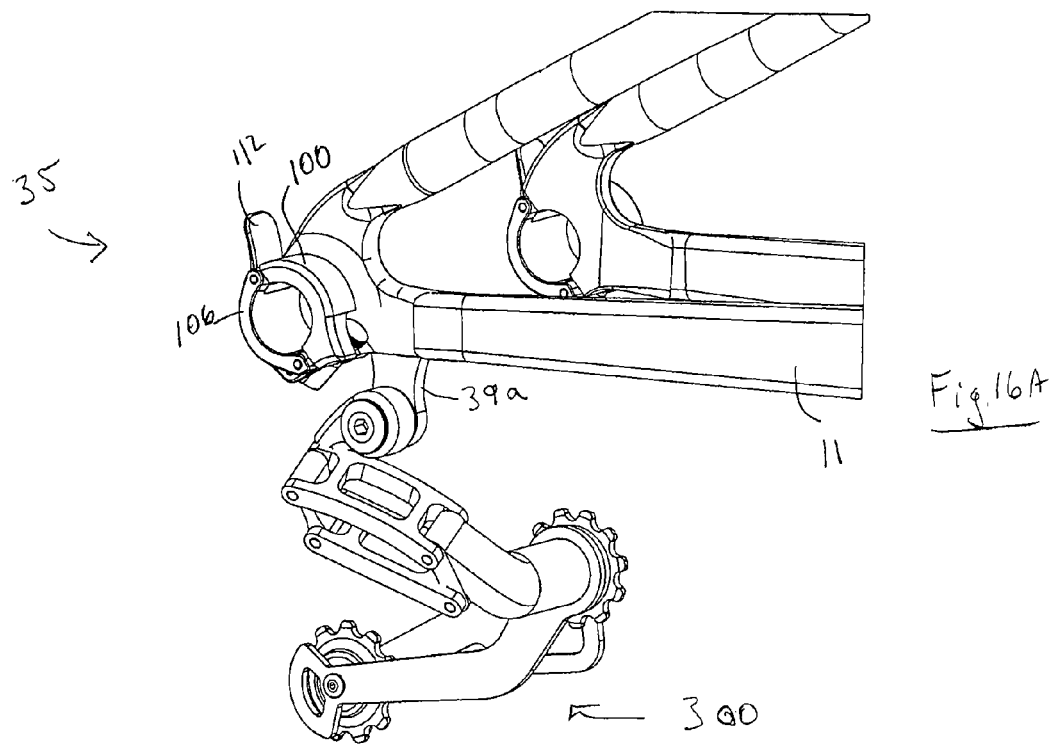
FIGS. 16A and B illustrate perspective views of a releasable clamp system according to one embodiment of the present invention.
Figure 16B:
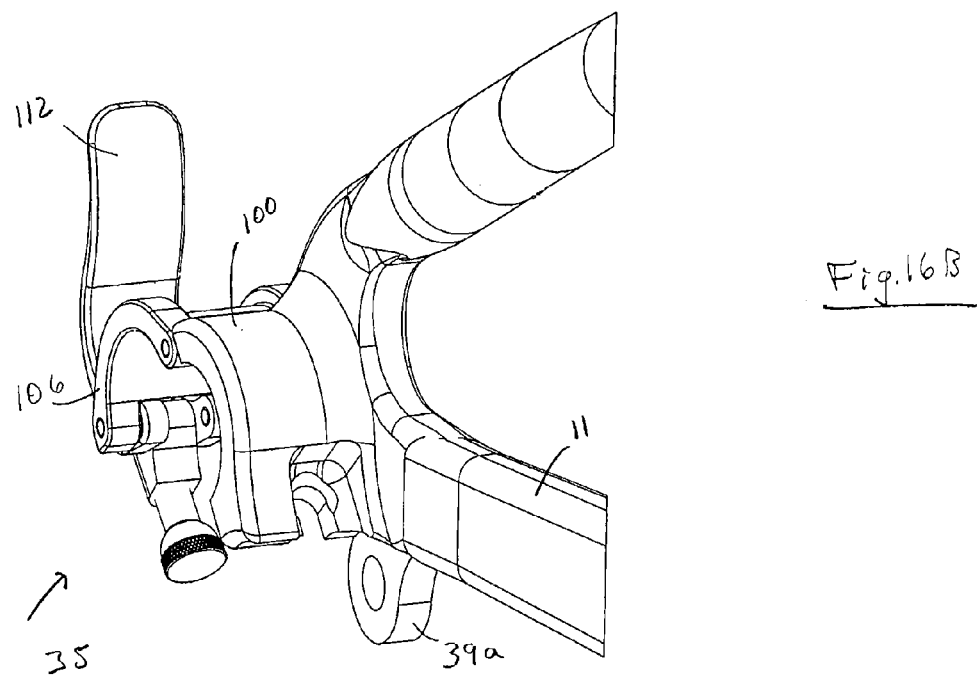

FIG. 16A shows a front view of clamp system 35 in the closed position, and FIG. 16B shows a front view of clamp system 35 in the open position. As seen here, chain stay 11 includes a chain stay derailleur mounting tab 39a that can be coupled with rear derailleur 300. Typically, chain stay derailleur mounting tab 39 is coupled with or integral to chain stay 11 adjacent to frame member 100. It is also appreciated that in some cases, suspension member derailleur mounting tab 39a may be coupled with a chain tensioned. In other cases, instead of being directly coupled with chain stay derailleur mounting tab 39a, rear derailleur 300 can be coupled with chain stay 11 via a separate intermediate member such as a derailleur hanger. Such a derailleur hanger can be attached with chain stay 11 adjacent to frame member 100.

Figure 17A:
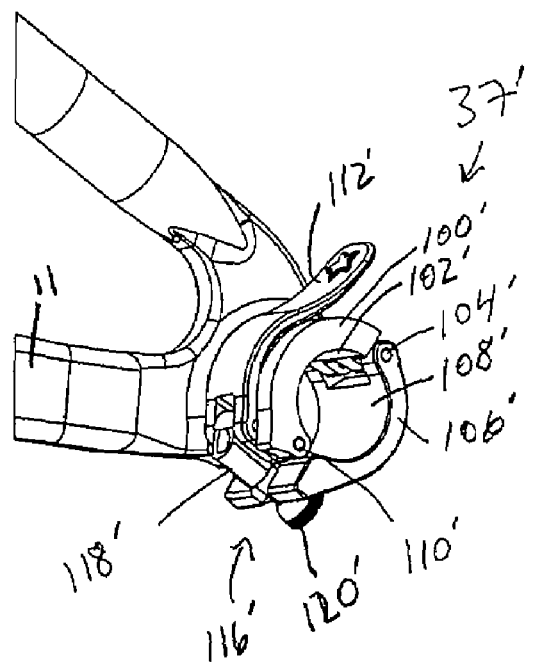
FIGS. 17A and B illustrate perspective views of a releasable clamp system according to one embodiment of the present invention.
Figure 17B:
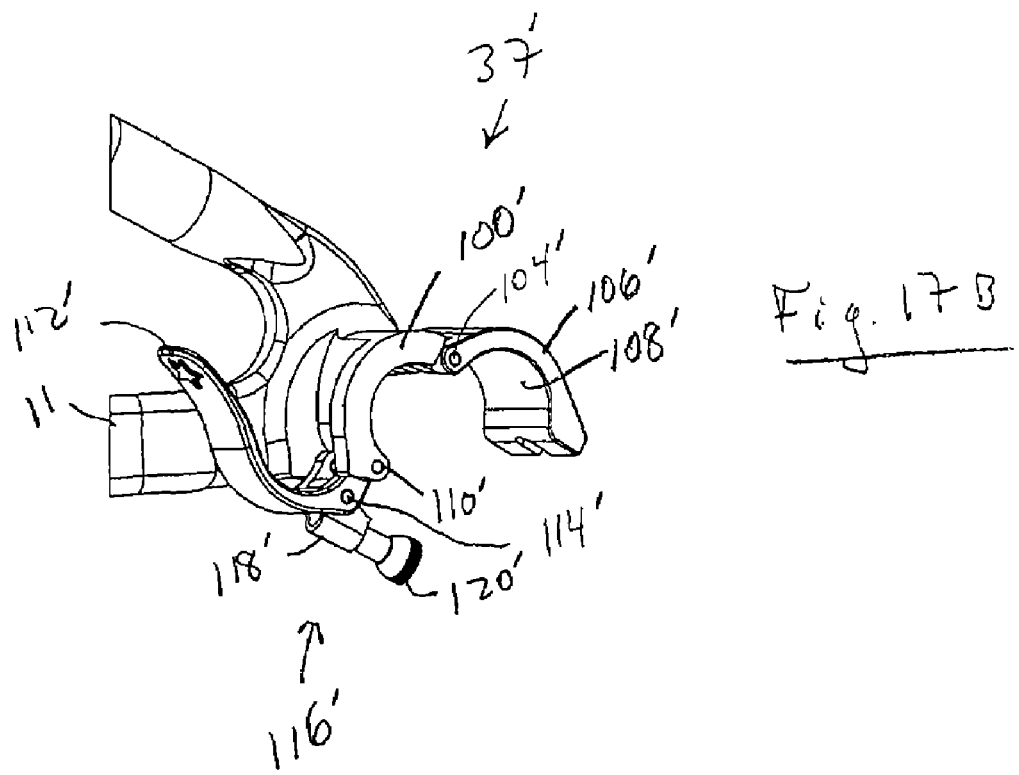

In another embodiment, FIG. 17A shows a front view of clamp system 37' in the closed position, and FIG. 17B shows a front view of clamp system 37' in the open position. To some extent, clamp system 37' can be constructed of components common with previously discussed clamp system 37, and thus can be described using similar reference numerals. It is appreciated that a corresponding clamp 35' on the drive train side of the vehicle (not shown) can be constructed in a likewise fashion. Inner surface 102' of frame member 100' can be adapted for receiving or contacting a portion of wheel axle 38 (not shown) and may be approximately semi-circular in shape, although other shapes are possible. Cover plate 106' can be pivotally attached with frame member 100', for example, by pivot pin 104'. Cover plate 106' can have an inner surface 108' for receiving or contacting another portion of wheel axle 38 (not shown). As such, inner surface 108' may also be approximately semi-circular. Lever 112' can be pivotally coupled with frame member 100', for example, by pivot pin 110'. Hook member 116' can be pivotally coupled with lever 112', for example, by pivot pin 114'. Hook member 116' can be constructed of housing 118' and hook 120'. Hook 120' can have a T-shaped geometry, a ball shaped geometry, or any other geometry that provides a mechanism whereby hook 120' can be anchored in association with shoulder 122' and slot 124'. Hook 120' can be threadably connected with housing 118' to permit the distance between hook 120' and lever 112' to be adjusted. As seen here, hook 120' can have a semi-spherical geometry and a knurled surface 121' whereby an operator can manually grasp and rotate hook 120', thus adjusting the distance between hook 120' and housing 118'.

Cover plate 106' can include shoulder 122' with slot 124' for receiving hook 120' when clamping wheel axle 38 (not shown) to frame member 100'. In use, wheel 40 (not shown) may be coupled with chain stay 11 by placing clamp system 37 in an open position as shown in FIG. 17B. Torsion springs 105' and 111' (see, e.g., FIG. 10) may be provided about pivot pins 104' and 110' to hold clamp system 37' in the open position. Wheel axle 38 (not shown) may then be moved vertically up and placed adjacent inner surface 102'. This is made possible by locating cover plate 106' at the top end of inner surface 102'. Cover plate 106' may then be pivoted about pivot pin 104' so as to engage a remaining portion of wheel axle 38. The operator may then place hook 120' into slot 124' so that the end of hook is beyond shoulder 122'. Lever 112' is then rotated until pivot pin 114' moves to an over center position (i.e., past a line passing between pin 110' and hook 120') and locks cover plate 106 in place where wheel axle 38 is clamped in place by surfaces 102' and 108' as shown, for example, in FIG. 17A. To adjust the clamping force, hook 120' may be screwed further into or out of housing 118. When ready to remove wheel 40, lever 112' is simply pulled and hook 120' is removed from slot 124'. These steps may be used to operate both clamp systems 35' and 37'.

Figure 18:
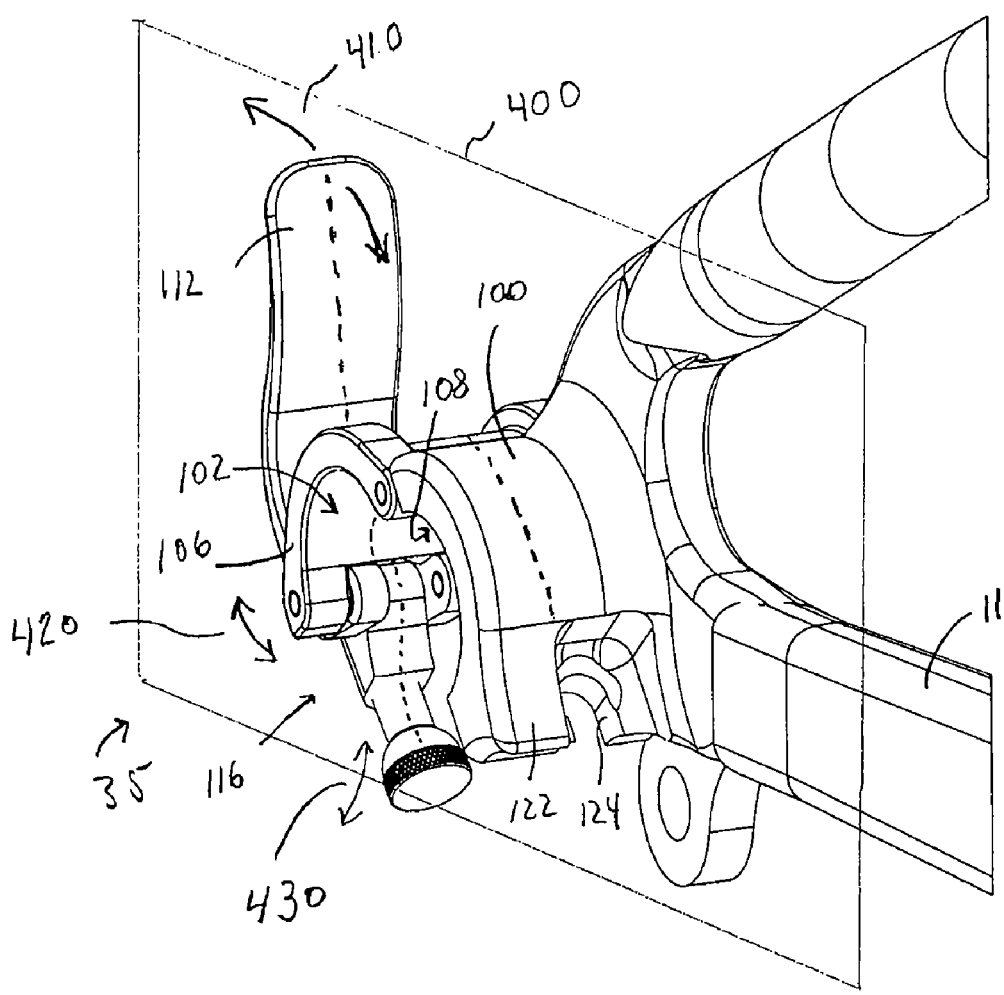
FIG. 18 illustrates a perspective view of a releasable clamp system according to one embodiment of the present invention.

FIG. 18 shows a front view of clamp system 35 in the open position. As seen here, clamp system 35 can include a means for securing cover plate 106 into the closed position (see, e.g., FIG. 16A). The means for securing cover plate 106 into the closed position can include lever 112, hook member 116, shoulder 122, and slot 124. Cover plate 106 may be movable along an arc or trajectory 420 between a closed position where frame member 100 and cover plate 106 generally encompass and clamp a wheel component (not shown), and an open position that permits removal of the wheel component. Lever 112 may be moveable along an arc 410 between a locked position corresponding to the closed position of cover plate 106, and an unlocked position corresponding to the open position of cover plate 106. Such movement of lever 112 between the locked position and the unlocked position can define a plane of movement 400 that intersects frame member 100. It is also appreciated that hook member 116 may move along an arc or trajectory 430 during operation of clamp system 35. Plane of movement 400 can include arc or trajectory 410, arc or trajectory 420, and/or arc or trajectory 430. Relatedly, plane of movement 400 can intersect lever 112, frame member 100, cover plate 106, and/or hook member 116. Plane of movement 400 may be perpendicular to a central longitudinal axis defined a wheel axle (not shown). Similarly, plane of movement 400 can be perpendicular to a central longitudinal axis defined by the combination of inner surface 102 and inner surface 108 when clamp system 35 is in the closed position (see, e.g., FIG. 16A). Although shown only in two dimensions, the width of plane of movement 400 can vary. For example, plane of movement 400 can have a width corresponding to a width of lever 112, cover plate 106, and/or hook member 116.

The releasable clamp systems and methods of the present invention can be used in any of a variety of wheeled devices. For example, although discussed herein primarily in terms of two wheeled vehicles, the present invention is well suited for use with unicycles, tricycles, quadricycles, velocipedes, motorcycles, automobiles, tractors, carts, carriages, strollers, trailers, wagons, wheelchairs, rickshaws, wheelbarrows, or with any other wheeled vehicle wherein an axle may be releasably coupled with a frame.

The invention has now been described in detail for purposes of clarity and understanding. However, it will be appreciated that certain changes and modifications may be practiced within the scope of the appended claims.

What is claimed is:

1. A releasable clamp system for clamping a wheel component of a wheel to a vehicle, comprising:
    a suspension member of the vehicle;
    a frame member defining a shape that is adapted to receive a portion of the wheel component, wherein the frame member is coupled with the suspension member of the vehicle;
    a cover plate pivotally attached to the frame member that is adapted to receive another portion of the wheel component, wherein the cover plate is movable between a closed position where the frame member and the cover plate generally encompass and clamp the wheel component, and an open position that permits removal of the wheel component;
    a lever pivotally attached to the cover plate; and
    a hook member pivotally attached to the lever, where the hook member is configured to hook onto the frame member and be pulled by the lever to move the cover plate toward the frame member when the cover plate is moved to the closed position.

2. A system as in claim 1, wherein the suspension member comprises a swingarm and the frame member comprises a rear dropout.

3. A system as in claim 1, wherein the suspension member comprises a front fork and the frame member comprises a front fork tip.

4. A system as in claim 1, further comprising an adjustment system that is configured to adjust the clamping force applied to the axle by the frame member and the cover plate when the lever is pulled.

5. A system as in claim 1, wherein the cover plate is pivotally attached to a top of the frame member to permit the wheel component to be vertically released downward from the frame member.

6. A system as in claim 1, wherein the wheel component comprises a wheel axle, and wherein the frame member and the cover plate each have inner surfaces that are adjacent to the wheel axle when the cover plate is in the closed position, and wherein the inner surfaces and the wheel axle each comprise a semi circular geometry.

7. A clamp system as in claim 1, wherein the hook member has a T shaped geometry or a ball shaped geometry, and wherein the frame member comprises a means for engaging the hook member to the frame member.

8. A clamp system as in claim 1, wherein the hook member comprises two pieces that are threadably connected together such that the clamping force applied to the wheel component is adjustable by rotating the two pieces relative to each other.

9. A clamp system as in claim 1, wherein the cover plate is pivotally attached to the suspension member at a pivot point, wherein the lever is pivotally attached to the cover plate at a pivot point, and further comprising torsion springs at each of the pivot points to hold the cover plate in the open position when not clamping the wheel component.

10. A clamp system as in claim 1, further comprising a derailleur mounting tab coupled with a member selected from the group consisting of the frame member, the cover plate, and the suspension member.

11. A clamp system as in claim 10, further comprising a derailleur coupled with the derailleur mounting tab.

12. A clamp system as in claim 1, wherein the frame member is configured to rest of a topward portion of the wheel component when installing the wheel onto the vehicle.

13. A releasable clamp system for clamping a wheel component of a wheel to a vehicle, comprising:
    a suspension member of the vehicle;
    a frame member defining a shape that is adapted to receive a portion of the wheel component, wherein the frame member is coupled with the suspension member of the vehicle;
    a cover plate pivotally attached to the frame member that is adapted to receive another portion of the wheel component, wherein the cover plate is movable between a closed position where the frame member and the cover plate generally encompass and clamp the wheel component, and an open position that permits removal of the wheel component;
    a lever pivotally attached to the frame member; and a hook member pivotally attached to the lever, where the hook member is configured to hook onto the cover plate and be pulled by the lever to secure the cover plate toward the frame member when the cover plate is moved to the closed position.

14. A system as in claim 13, wherein the suspension member comprises a swingarm and the frame member comprises a rear dropout.

15. A system as in claim 13, wherein the suspension member comprises a front fork and the frame member comprises a front fork tip.

16. A clamp system as in claim 13, wherein the hook member has a T shaped geometry or a ball shaped geometry, and wherein the frame member comprises a means for engaging the hook member to the frame member.

17. A clamp system as in claim 13, further comprising a derailleur mounting tab coupled with a member selected from the group consisting of the frame member, the cover plate, and the suspension member.

18. A clamp system as in claim 13, wherein the frame member is configured to rest of a topward portion of the wheel component when installing the wheel onto the vehicle.

19. A releasable clamp system for clamping a wheel component of a wheel to a vehicle, comprising:
a suspension member of the vehicle;
a frame member of the suspension member defining a shape that is adapted to receive a portion of the wheel component, wherein the frame member is coupled with the suspension member of the vehicle;
a cover plate pivotally attached to the frame member that is adapted to receive another portion of the wheel component, wherein the cover plate is movable between a closed position where the frame member and the cover plate generally encompass and clamp the wheel component, and an open position that permits removal of the wheel component; and
a means for securing the cover plate into the closed position and therefore clamping the wheel component in place, the means comprising a lever that is moveable between a locked position corresponding to the closed position of the cover plate, and an unlocked position corresponding to the open position of the cover plate, such that movement of the lever between the locked position and the unlocked position defines a plane of movement that intersects the frame member.

20. A system as in claim 19, further comprising an adjustment system that is configured to adjust the clamping force applied to the axle by the frame member and the cover plate when the lever is pulled.

* * * * *